US011613644B2

(12) United States Patent
Zorn et al.

(10) Patent No.: US 11,613,644 B2
(45) Date of Patent: Mar. 28, 2023

(54) AQUEOUS ACRYLIC POLYMER LATEXES AND THEIR USE AS BINDERS

(71) Applicant: BASF SE, Ludwigshafen am Rhein (DE)

(72) Inventors: Matthias Zorn, Ludwigshafen am Rhein (DE); Armin A. Burghart, Charlotte, NC (US); Timo Mangel, Ludwigshafen am Rhein (DE); Felix Laubersheimer, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 254 days.

(21) Appl. No.: 16/765,785

(22) PCT Filed: Nov. 19, 2018

(86) PCT No.: PCT/EP2018/081667
§ 371 (c)(1),
(2) Date: May 20, 2020

(87) PCT Pub. No.: WO2019/097041
PCT Pub. Date: May 23, 2019

(65) Prior Publication Data
US 2020/0291220 A1 Sep. 17, 2020

(30) Foreign Application Priority Data
Nov. 20, 2017 (EP) ..................... 17202522

(51) Int. Cl.
| | |
|---|---|
| C08L 33/14 | (2006.01) |
| C08K 3/013 | (2018.01) |
| C08F 220/18 | (2006.01) |
| C08F 2/00 | (2006.01) |
| C08F 8/30 | (2006.01) |
| C08F 220/06 | (2006.01) |
| C08F 220/14 | (2006.01) |
| C08F 220/34 | (2006.01) |
| C08K 3/22 | (2006.01) |
| C08K 3/26 | (2006.01) |
| C08K 3/34 | (2006.01) |
| C08K 5/3412 | (2006.01) |
| C09D 133/14 | (2006.01) |

(52) U.S. Cl.
CPC .............. *C08L 33/14* (2013.01); *C08F 2/001* (2013.01); *C08F 8/30* (2013.01); *C08F 220/06* (2013.01); *C08F 220/14* (2013.01); *C08F 220/1804* (2020.02); *C08F 220/1808* (2020.02); *C08F 220/34* (2013.01); *C08K 3/013* (2018.01); *C08K 3/22* (2013.01); *C08K 3/26* (2013.01); *C08K 3/34* (2013.01); *C08K 5/3412* (2013.01); *C09D 133/14* (2013.01); *C08K 2003/2241* (2013.01); *C08K 2003/265* (2013.01); *C08L 2201/52* (2013.01)

(58) Field of Classification Search
None
See application file for complete search history.

(56) References Cited

U.S. PATENT DOCUMENTS

| | | | | |
|---|---|---|---|---|
| 3,261,796 | A * | 7/1966 | Simms ................... | C08F 20/62 |
| | | | | 524/802 |
| 3,261,797 | A * | 7/1966 | Werner, Jr. .............. | C08F 8/30 |
| | | | | 524/96 |
| 4,269,749 | A | 5/1981 | Marriott et al. | |
| 4,988,762 | A | 1/1991 | Overbeek et al. | |
| 4,999,218 | A | 4/1991 | Rehmer et al. | |
| 5,047,295 | A | 12/1991 | Dotzauer et al. | |
| 6,242,515 | B1 | 6/2001 | Zhao et al. | |
| 10,767,072 | B2 * | 9/2020 | Nabuurs ................... | B05D 7/14 |
| 2012/0077906 | A1 | 3/2012 | Herold et al. | |

FOREIGN PATENT DOCUMENTS

| | | | | |
|---|---|---|---|---|
| CA | 1338895 | C * | 2/1997 | .......... C07F 9/65062 |
| DE | 3827975 | A1 | 3/1990 | |
| DE | 3901073 | A1 | 7/1990 | |
| DE | 4003422 | A1 | 8/1991 | |
| DE | 19624299 | A1 | 1/1997 | |

(Continued)

OTHER PUBLICATIONS https://www.sigmaaldrich.com/US/en/technical-documents/technical-article/materials-science-and-engineering/polymer-synthesis/thermal-transitions-of-homopolymers, Mar. 2022 (Year: 2022).*

(Continued)

*Primary Examiner* — Satya B Sastri
(74) *Attorney, Agent, or Firm* — Faegre Drinker Biddle & Reath LLP

(57) ABSTRACT

The present invention relates to aqueous acrylic polymer latexes, which are suitable as binders in coating compositions for providing flexible roofing. The present invention also relates to coating compositions containing such binders, which are suitable for providing flexible roofing. The aqueous acrylic polymer latexes have a glass transition temperature $T_g$ of at most from $-10°$ C., in particular at most $-20°$ C., or, in case of a multi-stage polymer latex a weight average glass transition temperature $T_g$ of at most from $-10°$ C., where the polymer of the acrylic polymer latex has a carbon polymer backbone formed by polymerized ethylenically unsaturated monomers M comprising acrylic monomers, and where the carbon polymer backbone bears functional groups of the formula (I) attached to carbon atoms of the polymer backbone *—C(=O)—O-[A-NH]$_n$H (I) where the asterisk indicates the atom attached to a carbon atom of the polymer backbone, n is an integer, the number average of n in all functional groups of the formula (I) being >1, in particular at least 1.1 or at least 1.2 or at least 1.3, and A is selected from the group consisting of 1,2-ethandiyl or 1,2-propandiyl, where the functional groups of the formula (I) contribute to the total weight of the polymer in the acrylic polymer latex by 0.1 to 10% by weight.

15 Claims, No Drawings

(56) References Cited

FOREIGN PATENT DOCUMENTS

| | | | | |
|---|---|---|---|---|
| DE | 19621027 A1 | 11/1997 | | |
| DE | 19741184 A1 | 3/1999 | | |
| DE | 19741187 A1 | 3/1999 | | |
| DE | 19805122 A1 | 4/1999 | | |
| DE | 19828183 A1 | 12/1999 | | |
| DE | 19839199 A1 | 3/2000 | | |
| DE | 19840586 A1 | 3/2000 | | |
| DE | 19847115 C1 | 5/2000 | | |
| EP | 0771328 A1 | 5/1997 | | |
| WO | 01/74930 A1 | 10/2001 | | |
| WO | WO-0174930 A1 * | 10/2001 | ............. | C08J 3/005 |
| WO | 2012/038099 A1 | 3/2012 | | |
| WO | 2014/060456 A2 | 4/2014 | | |
| WO | WO-2018086861 A * | 5/2018 | ............ | C08F 220/14 |

OTHER PUBLICATIONS https://www.sigmaaldrich.com/US/en/technical-documents/technical-article/materials-science-and-engineering/polymer-synthesis/thermal-transitions-of-homopolymers, Apr. 2022 (Year: 2022).*
WO-2018086861-A1, May 2018, Machine Translation (Year: 2018).*
International Search Report and Written Opinion received for PCT Patent Application No. PCT/EP2018/081667, dated Feb. 14, 2019, 9 pages.

* cited by examiner

AQUEOUS ACRYLIC POLYMER LATEXES AND THEIR USE AS BINDERS

CROSS-REFERENCE TO RELATED APPLICATIONS

This application is a national stage application (under 35 U.S.C. § 371) of PCT/EP2018/081667, filed Nov. 19, 2018, which claims benefit of European Application No. 17202522.3, filed Nov. 20, 2017, both of which are incorporated herein by reference in their entirety.

The present invention relates to aqueous acrylic polymer latexes, which are suitable as binders in coating compositions for providing flexible roofing. The present invention also relates to coating compositions containing such binders, which are suitable for providing flexible roofing.

Flat roofs, including entirely and nearly flat roofs, i.e. roofs having a small slope or inclination, in particular of not more than 15°, must be protected against adverse effects of weathering, more particularly against rain, dew, mist, snow or extreme temperatures. In particular, water is problematic, as gravity and surface tension will pull it inside the smallest crack or crevice.

In former times, the protection of flat roofs roof was achieved by coatings on a bituminous basis, such as roofing felt. While these materials are cheap, their durability is not satisfactory. Moreover, there are environmental concerns. While roofing with metals such as copper or zing may be an alternative to bituminous materials, metal roofing is quite expensive. Recently, single ply roofing on the basis of sheets and panels of artificial rubber, such as EPDM (polymers based on ethylene, propylene and diene monomers) and TPO (polypropylene rubber and ethylene-co-polypropylene rubber), or thermoplastic polymers, such as PVC (polyvinyl chloride), has replaced roofing on bituminous basis. However, the use of sheets and panels bear the risk of mechanical damage in the course of transportation to the construction site, or during application on the construction site. Furthermore, the singly ply roofing requires a large number of panels or sheeting webs, which must be bonded adhesively in order to produce an assembly. These bonding sites, however, are a source of damage as a consequence of deficient bonding or aging, and this may lead to leaks and, ultimately, to failure of the roof coating.

More recently, liquid coating compositions for preparing flexible roofing came to the market. These liquid coating compositions are applied, e.g. by rolling, brushing or spraying, as a liquid coating to a flat roof and provide upon curing a seamless flexible roofing membrane. This technique is also termed liquid roofing. Coating compositions for liquid roofing can be applied as a repair to an existing roofing but they may be also applied to an uncoated flat roof as a flexible roofing membrane. Most liquid roofing compositions are based on 2K polyurethane or epoxy systems. While 2K systems provide flexible roofing of high mechanical strength, their components must be mixed immediately prior to their application, which bears a certain risk of incorrect application.

Apart from that, 2K systems are quite expensive and contain a considerable amount of organic solvent, which evaporates upon curing and thus is released to the environment.

An environmentally friendly alternative to liquid 2K coating compositions for liquid roofing systems are water based coating compositions containing an acrylic polymer latex or a polyurethane dispersion as a binder. While coating compositions based on polyurethane dispersions provide good mechanical strength and high flexibility, they are quite expensive due monomer costs. While acrylic polymer latexes are cheaper than polymer dispersions, the mechanical properties of the obtained coatings are not always satisfactory. In particular, the coatings obtained therefrom often do not have a sufficient tensile strength and elasticity and thus their tolerance for bridging cracks is poor. Apart from that, existing aqueous coating compositions for flexible roofing usually require long drying times upon their application, until the desired roofing has been formed. This disadvantage comes to bear particularly under cool, damp or rainy conditions. In particular, a rain shower may wash the fresh coating off. Moreover, during the drying process, there is always the risk of mechanical damage to the coating.

U.S. Pat. No. 6,242,515 describes binder compositions containing acrylic polymer latexes having carbonyl groups and dihydrazides of dicarboxylic acid, such as adipic dihydrazide (ADDH). These binders are used in coating compositions for providing high tensile strength and high flexibility and reduced water uptake to the coatings. Therefore, these binders can be used in coating compositions for flexible roofing. However, the dihydrazides of dicarboxylic acid are problematic for reasons of working hygiene.

WO 2012/038099 describes compositions for preparing flexible, waterproof roofings which contain a combination of a hydraulically setting binder such as Portland cement and a polymer latex. These compositions are dry powders, which cannot be used as such, but are mixed with water immediately prior to their application. These aqueous compositions are not stable, have a short pot life and must be consumed directly after their preparation. This bears a certain risk of incorrect application.

WO 2014/060456 describes binder compositions based on acrylic polymer latexes which contain a modified polyalkyleneimine. The coating compositions containing such binders have good mechanical properties and are quick setting and also provide early rain fastness, i.e. the risk of the freshly applied coating being washed off by a rain shower is minimized. Unfortunately, the coating compositions are not entirely stable and agglomeration and increase in viscosity is observed during storage, and the coatings tend to yellowing. Moreover, the polyalkyleneimines are expensive.

U.S. Pat. Nos. 3,261,796 and 4,988,762 describe aqueous polymer dispersions which bear aminoester radicals of the formula (A):

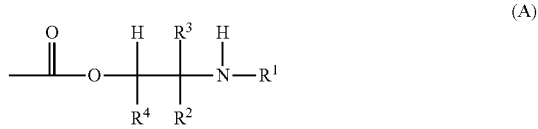

(A)

where $R^1$, $R^2$, $R^3$ and $R^4$ are inter alia H or alkyl. The polymer dispersions are suggested as binders in coating formulations for interior or exterior wall coatings. Liquid coating compositions for flexible roofing are not suggested.

There is an ongoing need for aqueous binders, which are suitable as binders in aqueous coating compositions for coating flat roofs and which avoid the disadvantages of the aqueous coating compositions for the coating of flat roofs known so far. In particular, the binders should provide quick setting coatings, have good mechanical properties such as high tensile strength and good flexibility and at the same time early rain fastness. Moreover, the coating compositions containing such binders should be stable, in particular upon storage for elevated times and/or storage at increased temperature. In particular, stability against agglomeration and viscosity increase is desired.

It was surprisingly found that these and further objects are achieved by the aqueous acrylic polymer dispersions as defined herein.

Therefore, a first aspect of the present invention relates to aqueous acrylic polymer latexes having a glass transition temperature $T_g$ of at most from −10° C., in particular at most −20° C., or, in case of a multi-stage polymer latex, a weight average glass transition temperature $T_g$ of at most from −10° C., where the polymer of the acrylic polymer latex has a carbon polymer backbone formed by polymerized ethylenically unsaturated monomers M comprising acrylic monomers, and where the carbon polymer backbone bears functional groups of the formula (I) attached to carbon atoms of the polymer backbone

$$*-C(=O)-O-[A-NH]_nH \qquad (I)$$

where the asterisk indicates the atom attached to a carbon atom of the polymer backbone,
n is an integer, the number average of n in all functional groups of the formula (I) being >1, in particular at least 1.1 or at least 1.2 or at least 1.3, and
A is selected from the group consisting of 1,2-ethandiyl or 1,2-propandiyl,
where the functional groups of the formula (I) contribute to the total weight of the polymer in the acrylic polymer latex by 0.1 to 10% by weight.

Coating compositions, which contain the acrylic polymer latexes of the present invention, provide coatings having good mechanical properties such as high tensile strength and good flexibility and at the same time early rain fastness. Moreover, the coating compositions containing such binders are stable, in particular upon storage for elevated times and/or storage at increased temperature, in particular against agglomeration and viscosity increase is desired. Moreover, the coatings do not show a significant tendency to yellow under exposure to UV light. Moreover, the binders provide good water tightness to the coating. Furthermore, the coatings obtained therefrom adhere very effectively to a wide variety of different substrates and are easy to apply and, in the course of the production of the roof coatings, cure rapidly and without a long drying time. Therefore, the acrylic polymer latexes of the present invention qualify as a binder in a coating composition for providing flexible roofing.

A second aspect of the present invention relates to method for preparing an aqueous acrylic polymer latex, which comprises reacting a carboxylated acrylic polymer latex having a glass transition temperature $T_g$ of at most from −10° C., in particular at most −20° C., or, in case of a multi-stage acrylic polymer latex, a weight average glass transition temperature $T_g$ of at most from −10° C., in particular at most −20° C., with at least one aziridine compound selected from aziridine, 2-methylaziridine and mixtures of aziridine and 2-methylaziridine, where the polymer of the carboxylated acrylic polymer latex is formed by polymerized ethylenically unsaturated monomers M, which comprise acrylic monomers and from 0.1 to 10% by weight, based on the total weight of the monomers M, of at least one ethylenically unsaturated monomer M2 having 1 or 2 carboxyl groups, and where the amount of the aziridine compound is chosen such that the molar ratio of aziridine compound to carboxyl groups present in the carboxylated latex is at least 0.1:1, preferably at least 0.5:1, especially at least 1:1, e.g. in the range from 0.1:1 to 5:1, in particular in the range from 0.5:1 to 5:1 and especially in the range from 1:1 to 5:1 or 1.1:1 to 5:1.

The present invention also relates to acrylic polymer latexes, which are obtainable by the process of the present invention. These polymer latexes bear functional groups attached to the carbon backbone of the polymer, which functional groups correspond to the groups of formula (I). The functional groups of the formula (I) result from the reaction of the aziridine compound with the carboxyl groups. These polymer latexes may also bear carboxyl groups, which correspond to the carboxyl groups that did not underwent the reaction with the aziridine compound.

A third aspect of the present invention relates to the use of the acrylic polymer latexes of the present invention binders in coating compositions for providing flexible roofing.

A fourth aspect of the present invention relates to aqueous coating compositions, which are suitable for providing flexible roofing, which contain an acrylic polymer latex of the present invention as a binder, in particular as the sole or almost the sole binder. These coating compositions usually contain at least one inorganic particulate material selected from inorganic pigments, inorganic fillers and mixtures thereof, in particular at least one filler, or a mixture of at least one inorganic filler and one or more pigments.

A fifth aspect of the present invention relates to the use of an aqueous coating composition according to the present invention for providing a flexible roofing and to a method for providing a flexible roofing.

As used herein, the term "flat roof" refers to a roof having a small slope or inclination angle, respectively, in particular roofs having a slope or inclination of not more than 15°, especially of not more than 10° or not more than 5°.

As used herein, the term "polymer latex" relates to an aqueous polymer dispersion, where the polymer has a C—C backbone formed by polymerized ethylenically unsaturated monomers, and where the polymer is present in the form of finely dispersed particles in an aqueous liquid phase. In the context of the term "polymer latex" the term "aqueous liquid phase" means water and aqueous compositions consisting predominately in particular at least 95% by weight of water, but which may have dissolved therein components usually found in polymer latexes, such as surfactants, biocides and inorganic salts. Usually, the concentration of volatile compounds in the aqueous phase is less than 1% by weight, based on the total weight of the water contained in the aqueous phase.

As used herein, the term "acrylic polymer latex" relates to a polymer latex as defined herein, wherein the polymer is formed by polymerized ethylenically unsaturated monomers M, which comprise at least one monomer, selected from monoethylenically unsaturated acrylate ester monomers having a water solubility of at most 50 g/L at 20° C. and 1 bar and monoethylenically unsaturated methacrylate ester monomers having a water solubility of at most 50 g/L at 20° C. and 1 bar as main monomer component. In other words, the total amount of monoethylenically unsaturated (meth)acrylate ester monomers having a water solubility of at most 50 g/L at 20° C. and 1 bar is at least 50% by weight, in particular at least 60% by weight, especially at least 70% by weight or at least 80% by weight, based on the total amount of the monomers M which form the polymer.

Here and in the following the term (meth)acrylate ester monomers refers to both, acrylate ester monomers and methacrylate ester monomers. Likewise, the term (meth) acrylic acid refers to both, acrylic acid and methacrylic acid.

Suitable monoethylenically unsaturated (meth)acrylate ester monomers are in particular the alkyl esters of acrylic acid, in particular the $C_1$-$C_{20}$ alkyl esters of acrylic acid, hereinafter termed alkyl acrylates and $C_1$-$C_{20}$ alkyl acrylates, respectively, cycloalkyl esters of acrylic acid, in particular the $C_5$-$C_{20}$ cycloalkyl esters of acrylic acid, hereinafter termed cycloalkyl acrylates and $C_5$-$C_{20}$ cycloalkyl acrylates, respectively, alkyl esters of methacrylic acid, in particular $C_1$-$C_{20}$ alkyl esters of methacrylic acid, hereinafter termed alkyl methacrylates and $C_1$-$C_{20}$ alkyl methacrylates, respectively, cycloalkyl esters of methacrylic acid, in particular the $C_5$-$C_{20}$ cycloalkyl esters of methacrylic acid, hereinafter termed cycloalkyl methacrylates and $C_5$-$C_{20}$ cycloalkyl methacrylates.

Here and in the following, prefix $C_n$-$C_m$ indicates the number of carbon atoms a compound or a radical may have.

For example, "$C_1$-$C_{20}$ alkyl" means a linear or branched, saturated hydrocarbon radical (i.e. alkyl), which may have from 1 to 20 carbon atoms, and includes $C_1$-$C_4$ alkyl, such as methyl, ethyl, n-propyl, 2-propyl (=isopropyl), n-butyl, 2-butyl, 2-methylpropyl and 1,1-dimethylethyl (tert.-butyl), and also having 4 to 10 carbon atoms, such as n-pentyl, 2-pentyl, 2-methylbutyl, 3-methylbutyl, 1,2-di methyl propyl, 1,1-di methyl propyl, 2,2-dimethylpropyl, 1-ethylpropyl, n-hexyl, 1-methylpentyl, 2-methylpentyl, 1-ethylbutyl, 2-ethylbutyl, n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 1-propylheptyl, 2-propylheptyl, n-undecyl, isoundecyl, n-dodecyl, isododecyl, stearyl and the like.

"$C_5$-$C_{20}$ cycloalkyl" means a saturated cyclic hydrocarbon radical, which is unsubstituted or bears one or more, e.g. 1, 2, 3 or 4 alkyl radicals, in particular $C_1$-$C_4$ alkyl radicals, the total number of the radical being from 5 to 20 carbon atoms.

Examples of cycloalkyl include cyclopentyl, cyclohexyl, cycloheptyl, cyclooctyl, cyclododecyl, 4-methylcyclohexyl and 4-tert.-butylcyclohexyl.

Examples of alkyl acrylates, in particular $C_1$-$C_{20}$ alkyl acrylates include, but are not limited to methyl acrylate, ethyl acrylate, n-propyl acrylate, isopropyl acrylate, n-butyl acrylate, 2-butyl acrylate, tert-butyl acrylate, n-pentyl acrylate, isopentyl acrylate, n-hexyl acrylate, n-heptyl acrylate, n-octyl acrylate, 2-ethylhexyl acrylate, 2-propylpentyl acrylate, n-decyl acrylate, 2-propylheptyl acrylate, $C_{10}$ isoamyl guerbet acrylate, 1-propylheptyl acrylate, lauryl acrylate and stearyl acrylate.

Examples of alkyl methacrylates, in particular $C_1$-$C_{20}$ alkyl methacrylates include, but are not limited to methyl methacrylate, ethyl methacrylate, n-propyl methacrylate, isopropyl methacrylate, n-butyl methacrylate, 2-butyl methacrylate, tert-butyl methacrylate, n-pentyl methacrylate, isopentyl methacrylate, n-hexyl methacrylate, n-heptyl methacrylate, n-octyl methacrylate, 2-ethylhexyl methacrylate, 2-propylpentyl methacrylate, n-decyl methacrylate, 2-propylheptyl methacrylate, $C_{10}$ isoamyl guerbet methacrylate, 1-propylheptyl methacrylate, lauryl methacrylate and stearyl methacrylate.

Examples of cycloalkyl acrylates, in particular $C_5$-$C_{20}$ cycloalkyl acrylates include, but are not limited to cyclopentyl acrylate, cyclohexyl acrylate, 4-methylcyclohexyl acrylate and 4-tert-butylcyclohexyl acrylate.

Examples of cycloalkyl methacrylates, in particular $C_5$-$C_{20}$ cycloalkyl methacrylates include, but are not limited to cyclopentyl methacrylate, cyclohexyl methacrylate, 4-methylcyclohexyl methacrylate and 4-tert-butylcyclohexyl methacrylate.

According to the invention, the polymer contained in the acrylic polymer latex bears functional groups of the formula (I), which are attached to carbon atoms of the polymer backbone. In particular, each radical of the formula (I) is attached to an individual carbon atom of the polymer backbone, which means that the carbon atoms of the polymer backbone carry at most one radical of the formula (I). A skilled person will readily appreciate that the groups of formula (I) within the polymer may be identical or different with regard to both, variable A and integer n. Therefore, a skilled person will readily appreciate that the variable n in groups of formula (I) within the polymer may have a number average, which is not an integer but a rational number. The number average of the integer n may be calculated by the following formula (1):

$$\bar{n} = M \cdot X^{-1} \cdot M_A^{-1} \quad (1)$$

where $\bar{n}$ is the number average of the integer n, M is the total mass of -[A-NH]$_n$H in the polymer per 1 g of the polymer, X is the molar amount of groups of formula (I) in 1 g of the polymer and M is the molar weight of the group A-NH. It is apparent to a skilled person that M can be calculated from the nitrogen content of the polymer, X can be determined spectroscopically or by titration of the amino groups, while $M_A$ can be easily calculated.

With regard to the formula (I), the variable A is preferably ethan-1,2-diyl, i.e. $CH_2CH_2$.

With regard to the formula (I), the integer n is in the range from 1 to 10, in particular in the range from 1 to 5 and especially in the range from 1 to 4. The number average of n is frequently in the range from 1.1 to 5, in particular in the range from 1.2 to 4 and especially in the range from 1.3 to 3.

The radicals of formula (I) generally contribute to the mass of the polymer by 0.1 to 10% by weight, in particular by 0.2 to 8% by weight and more particularly by 0.5 to 5% by weight, based on the mass of the polymer contained in the acrylic polymer latex.

The radicals of formula (I) will generally be present in an amount from 0.01 to 1 mol/kg, in particular in the range from 0.02 to 0.8 mol/kg and especially in the range from 0.05 to 0.5 mol/kg, based on the mass of the polymer contained in the acrylic polymer latex.

It has been found beneficial, if the polymer in the acrylic polymer latex additionally contains functional groups, selected from ketogroups and aldehyde groups. These groups will usually correspond to the formulae (II) or (III)

*-Q-A'-C(=O)—R (II)

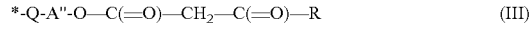

*-Q-A"-O—C(=O)—CH$_2$—C(=O)—R (III)

where the asterisk indicates the atom attached to a carbon atom of the polymer backbone, Q is a single bond, O, C(=O)O or C(=O)NH, where in the last two groups the carbon atom of C(=O) is bound to the carbon atom of the polymer backbone;

A' is $C_1$-$C_6$ alkandiyl, in particular $C_2$-$C_4$-alkandiyl, such as $CH_2$, 1,2-ethandiyl, 1,2-propandiyl, 1,3-propandiyl, 1,4-butandiyl, 2-methyl-1,2-propandiyl or 1-methyl-1,2-propandiyl;

A" is $C_1$-$C_6$ alkandiyl, in particular $C_2$-$C_4$-alkandiyl, such as $CH_2$, 1,2-ethandiyl, 1,2-propandiyl, 1,3-propandiyl, 1,4-butandiyl, 2-methyl-1,2-propandiyl or 1-methyl-1,2-propandiyl;

Q-A' together may also form a single bond;
R is hydrogen or $C_1$-$C_6$ alkyl, in particular $C_1$-$C_3$ alkyl and especially methyl.

In formulae (II) and (III) the variables Q, A' and R have in particular the following meanings:
Q is C(=O)O or C(=O)NH;
A' is 2-methyl-1,2-propandiyl or 1-methyl-1,2-propandiyl;
A" is 1,2-ethandiyl;
R is $C_1$-$C_3$ alkyl and especially methyl.

In particular, the group of formula (II) corresponds to the group of the formulae (IIa) or (IIb):

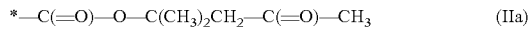
$$*-C(=O)-O-C(CH_3)_2CH_2-C(=O)-CH_3 \quad (IIa)$$

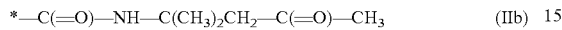
$$*-C(=O)-NH-C(CH_3)_2CH_2-C(=O)-CH_3 \quad (IIb)$$

In particular, the group of formula (III) corresponds to the group of the formulae (IIIa) or (IIIb):

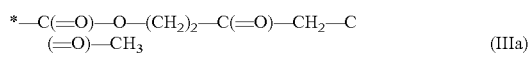
$$*-C(=O)-O-(CH_2)_2-C(=O)-CH_2-C(=O)-CH_3 \quad (IIIa)$$

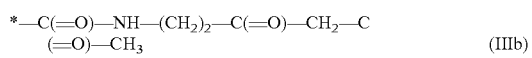
$$*-C(=O)-NH-(CH_2)_2-C(=O)-CH_2-C(=O)-CH_3 \quad (IIIb)$$

The molar amount of the aldehyde or keto groups, if present, is usually in the range from 0.01 to 0.6 mol/kg, in particular in the range from 0.02 to 0.5 mol/kg and especially in the range from 0.03 to 0.3 mol/kg, based on the mass of the polymer contained in the acrylic polymer latex.

In addition, the groups of formula (I) and the optionally present aldehyde or keto groups, the polymers of the invention may also bear carboxyl groups. The molar amount of carboxyl groups, if present, is usually in the range from $10^{-3}$ to 0.5 mol/kg, in particular in the range from 0.005 to 0.4 mol/kg and especially in the range from 0.01 to 0.3 mol/kg. Frequently, the molar amount of carboxyl groups does not exceed the molar amount of groups of the formula (I). In particular, the molar ratio of carboxyl groups to groups of formula (I) does not exceed 1:1.5 and, if present, may be as low as 1:10 or even lower, such as 1:20.

According to the invention, the polymer latex, or more precisely the dispersed polymer contained in the acrylic polymer latex, has a glass transition temperature $T_g$, which does not exceed $-10°$ C. and which preferably does not exceed $-20°$ C. In particular, the glass transition temperature $T_g$ will not be lower than $-60°$ C. and is in particular in the range from $-10$ to $-50°$ C. and especially in the range from $-20$ to $-45°$ C. If the polymer latex contains two or more different polymers having different glass transition temperatures, e.g. in case of a mixture of two or more latexes or in case of multi-stage polymer latex, the weight average of the glass transition temperatures of these polymers does not exceed $-10°$ C. and in particular does not exceed $-20°$ C. and is in particular in the range from $-10$ to $-50°$ C. and especially in the range from $-20$ to $-45°$ C.

The glass transition temperature $T_g$ as referred to herein is determined by the DSC method (differential scanning calorimetry) using a heating rate of 20 K/min and applying the midpoint measurement in accordance with ISO 11357-2:2013-05, with sample preparation preferably to DIN EN ISO 16805:2005-07. In case of multiple polymers contained in the latex, the weight average glass transition temperature can be calculated from the glass by the following equation (2):

$$T_g(\text{average}) = m(1) \cdot T_g(1) + m(2) \cdot T_g(2) + \ldots m(n) \cdot T_g(n), \quad (2)$$

where m(2), m(2), . . . m(n) are the mass fractions of the individual polymers 1, 2, . . . and n contained in the latex and $T_g(1)$, $T_g(2)$, . . . . $T_g(n)$ are the glass transition temperatures of the individual polymers 1, 2, . . . and n contained in the latex.

Controlled variation in the nature and amount of the monomers allows the skilled person in accordance with the invention to prepare aqueous polymer compositions whose polymers have a glass transition temperature within the desired range. Guidance is possible by means of the Fox equation. According to Fox (T. G. Fox, Bull. Am. Phys. Soc. 1956 [Ser. II] 1, page 123 and according to Ullmann's Encyclopädie der technischen Chemie, vol. 19, page 18, 4th edition, Verlag Chemie, Weinheim, 1980), the glass transition temperature of copolymers can be calculated in good approximation by the following equation (3):

$$1/T_g = x^1/T_g^1 + x^2/T_g^2 + \ldots x^n/T_g^n, \quad (3)$$

where $x^1, x^2, \ldots x^n$ are the mass fractions of the monomers 1, 2, . . . n and $T_g^1, T_g^2, \ldots T_g^n$ are the glass transition temperatures of the polymers constructed in each case only from one of the monomers 1, 2, . . . n, in degrees Kelvin. The $T_g$ values for the homopolymers of the majority of monomers are known and are listed for example in Ullmann's Encyclopedia of Industrial Chemistry, volume A21, page 169, 5th edition, VCH Weinheim, 1992; further sources of glass transition temperatures for homopolymers include, for example, J. Brandrup, E. H. Immergut, Polymer Handbook, 1st edition, J. Wiley, New York 1966, 2nd edition, J. Wiley, New York 1975, and 3rd edition, J. Wiley, New York 1989. For ethyl acrylate a figure of $-13°$ C. is used.

In the aqueous acrylic polymer latex of the invention, the dispersed polymers are in the form of polymer particles. The polymer particles typically have a weight-average diameter $D_w$ in the range from 50 to 1000 nm, in particular in the range from 60 to 500 nm and especially in the range from 80 to 350 nm. Determination of the weight average particle diameters is known to the person skilled in the art and is carried out, for example, by the analytical ultracentrifugation method. In this specification, weight-average particle diameter is understood as meaning the weight-average $D_{w50}$ value determined by the method of analytical centrifugation (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175). The weight-average particle diameter can also be determined by HDC (Hydrodynamic Chromatography fractionation), as for example described by H. Wiese, "Characterization of Aqueous Polymer Dispersions" in Polymer Dispersions and Their Industrial Applications (Wiley-VCH, 2002), pp. 41-73. For example, HDC measurements can be carried out using a PL-PSDA particle size distribution analyzer (Polymer Laboratories, Inc.), by injecting a small amount of sample into an aqueous eluent containing an emulsifier, resulting in a concentration of approx. 0.5 g/l and pumping the resulting mixture through a glass capillary tube of approx. 15 mm diameter packed with polystyrene spheres. As determined by their hydrodynamic diameter, smaller particles can sterically access regions of slower flow in capillaries, such that on average the smaller particles experience slower elution flow. The fractionation can be finally monitored using e.g. an UV-detector which measured the extinction at a fixed wavelength of 254 nm.

Besides the monoethylenically unsaturated (meth)acrylate ester monomers, the monomers M forming the polymer of the acrylic polymer latex may comprise other monomers, which are different from monoethylenically unsaturated (meth)acrylate ester monomers. Such monomers include in particular monoethylenically unsaturated monomers, which have a low water solubility of at most 50 g/L at 20° C. and 1 bar.

Examples of monoethylenically unsaturated monomers, which have a low water solubility of at most 50 g/L at 20° C. and 1 bar include, but are not limited to
- vinylaromatic monomers, in particular mono-vinyl substituted aromatic hydrocarbons, such as styrene, 2-methylstyrene, 4-methylstyrene, 2-n-butylstyrene, 4-n-butylstyrene, 4-n-decylstyrene and α-methylstyrene, with particular preference given to styrene;
- olefins and haloolefins, such as ethylene, propene, vinyl chloride and vinylidene chloride;
- vinyl esters and allyl esters of saturated $C_1$-$C_{30}$ monocarboxylic acids, especially of saturated $C_1$-$C_{30}$ monocarboxylic acids, such as vinyl acetate, vinyl propionate, vinyl hexanoate, vinyl octanoate and vinyl esters of Versatic acids.

Hereinafter, monomers, which have a low water solubility of at most 50 g/L at 20° C. and 1 bar, are denominated monomers M1. These monomers M1 include the aforementioned monoethylenically unsaturated (meth)acrylate ester monomers having a water solubility of at most 50 g/L at 20° C. and 1 bar and the non-ionic monoethylenically unsaturated monomers having a water solubility of at most 50 g/L at 20° C. and 1 bar.

In particular, the monomers M1 are selected from $C_1$-$C_{20}$-alkyl esters of acrylic acid, $C_1$-$C_{20}$-alkylesters of methacrylic acid, and vinyl aromatic monomers. In particular, the monomers M1 are selected from $C_1$-$C_{10}$-alkyl esters of acrylic acid, $C_1$-$C_{10}$-alkylesters of methacrylic acid, and mono-vinyl substituted aromatic hydrocarbon monomers, such as styrene.

Preferably, the monomers M1 are selected from at least one monomer M1a, which is selected from $C_1$-$C_{20}$-alkyl esters of acrylic acid, and mixtures of at least one non-ionic monomer M1a with at least one further non-ionic monomer M1b, which is selected from $C_1$-$C_{20}$-alkylesters of methacrylic acid and mono-vinyl substituted aromatic hydrocarbon monomers, such as styrene.

More preferably, the monomers M1 are selected from at least one monomer M1a, which is selected from $C_2$-$C_{10}$-alkyl esters of acrylic acid, and mixtures of at least one monomer M1a with at least one further non-ionic monomer M1b, which is selected from $C_1$-$C_4$-alkylesters of methacrylic acid, especially methyl methacrylate, and vinyl aromatic monomers, especially styrene, and mixtures thereof.

Even more preferably, the monomers M1 are selected from the group consisting of mixtures of
- at least one $C_2$-$C_{10}$ alkyl acrylate as monomer M1a, such as ethyl acrylate, n-butyl acrylate, n-hexyl acrylate, n-octyl acrylate, 2-ethylhexyl acrylate, 2-propylheptyl acrylate and mixtures thereof; with
- at least one $C_1$-$C_4$ alkyl methacrylate as monomer M1b, such as methyl methacrylate, methyl ethacrylate, propyl methacrylate, n-butyl methacrylate, and mixtures thereof.

Likewise preferred, the monomers M1 may be selected from the group consisting of mixtures of
- at least one $C_2$-$C_{10}$ alkyl acrylate as monomer M1a, such as ethyl acrylate, n-butyl acrylate, n-hexyl acrylate, n-octyl acrylate, 2-ethylhexyl acrylate, 2-propylheptyl acrylate and mixtures thereof, with
- at least one monomer M1b, selected from vinylaromatic hydrocarbon monomers such as styrene and mixtures thereof with at least one $C_1$-$C_4$ alkyl methacrylate, such as methyl methacrylate, methyl ethacrylate, propyl methacrylate, n-butyl methacrylate, and mixtures thereof.

Especially, the monomers M1 are selected from the group consisting of mixtures of
- methyl methacrylate as monomer M1b, with
- at least one $C_2$-$C_{10}$ alkyl acrylate different from tert.-butyl methacrylate as monomer M1a, such as ethyl acrylate, n-butyl acrylate, n-hexyl acrylate, n-octyl acrylate, 2-ethylhexyl acrylate, 2-propylheptyl acrylate and mixtures thereof.

Especially, the monomers M1 may also be selected from the group consisting of mixtures of
- at least one monomer M1b, selected from styrene and mixtures of styrene and methyl methacrylate, with
- at least one monomer M1a selected from $C_2$-$C_{10}$ alkyl acrylates different from tert.-butyl methacrylate, such as ethyl acrylate, n-butyl acrylate, n-hexyl acrylate, n-octyl acrylate, 2-ethylhexyl acrylate, 2-propylheptyl acrylate and mixtures thereof.

The total amount of monomers M1 is usually at least 70% by weight, in particular at least 80% by weight and especially at least 85% by weight, based on the total amount of monomers M, which form the polymer contained in the acrylic polymer latex. Frequently, the total amount of monomers M1 is in the range of 70 to 99.8% by weight, in particular in the range of 80 to 99% by weight and especially in the range of 85 to 98% by weight, based on the total amount of monomers M, which form the polymer contained in the acrylic polymer latex.

In the mixtures of monomers M1a and M1b, the weight ratio of M1a:M1b may vary in particular from 10:1 to 2:1, more particularly from 8:1 to 3:1, especially from 7:1 to 4:1.

It has been found beneficial, if the monomers M comprise less than 5% by weight, in particular less than 1% by weight, based on the total of the monomers M forming the polymer of the acrylic polymer latex, of vinylaromatic monomers or even no vinylaromatic monomer.

Besides the repeating units of monomers M1, the polymer carbon backbone comprises repeating units of at least one polymerized monomer, which bears an ethylenically unsaturated double bond and at least one functional group of the formula (I) attached to the double bound. These monomers will frequently have the following formula (I'):

HC(R'')=C(R')—C(=O)—O-[A-NH]$_n$H    (I')

where A and n are as defined for formula (I) and where
R' is hydrogen, $C_1$-$C_4$ alkyl or phenyl, and in particular hydrogen or methyl, and
R'' is hydrogen $C_1$-$C_4$ alkyl, phenyl, COOH or a radical of formula (I) and where R'' is in particular hydrogen.

Repeating units of polymerized monomers, which bear an ethylenically unsaturated double bond and at least one functional group of the formula (I) attached to the double bound can be obtained by reacting a carboxylated acrylic polymer latex having polymerized repeating units of monoethylenically unsaturated monomers having 1 or 2 carboxyl groups with an aziridine compound selected from aziridine, 2-methylaziridine and mixtures of aziridine and 2-methylaziridine.

Monoethylenically unsaturated monomers having 1 or 2 carboxyl groups are hereinafter termed monomers M2 and include in particular monoethylenically unsaturated monocarboxylic acids having 3 to 6 carbon atoms and monoethylenically unsaturated dicarboxylic acids having 4 to 6 carbon atoms.

Repeating units of polymerized monomers, which bear an ethylenically unsaturated double bond and at least one functional group of the formula (I) attached to the double bound, can also be obtained polymerizing the monomers M, which contain monomers of the formula (I') to obtain the polymer latex of the present invention. Monomers of the formula (I') can be prepared by reaction of monoethylenically unsaturated monomers M2, which are in particular selected from monoethylenically unsaturated monocarboxylic acids having 3 to 6 carbon atoms and monoethylenically unsaturated dicarboxylic acids having 4 to 6 carbon atoms, with an aziridine compound selected from aziridine, 2-methylaziridine and mixtures of aziridine and 2-methylaziridine.

Frequently, the monomers M, which form the polymer carbon backbone, comprise one or more monoethylenically unsaturated monomers M2 having 1 or 2 carboxyl groups. Suitable monomers M2 include, but are not limited to monoethylenically unsaturated monocarboxylic acids having 3 to 6 carbon atoms, such as acrylic acid, methacrylic acid, crotonic acid, 2-ethylpropenoic acid, 2-propylpropenoic acid, 2-acryloxyacetic acid and 2-methacryloxyacetic acid;

monoethylenically unsaturated dicarboxylic acids having 4 to 6 carbon atoms, such as itaconic acid and fumaric acid.

Amongst the aforementioned monomers M2, preference is given to monoethylenically unsaturated monocarboxylic acids. Particular preference is given to acrylic acid, methacrylic acid and mixtures thereof. In a particular group of embodiments, the monomer M2 comprises methacrylic acid. Especially, the monomer M2 is methacrylic acid or a mixture of acrylic acid and methacrylic acid.

The total amount of repeating units bearing at least one functional group of the formula (I) and repeating units of monomers M2 is frequently from 0.2 to 20% by weight, in particular from 1 to 15% by weight and especially 2 to 10% by weight, based on the total weight of the polymer or the monomers M forming the carbon backbone of the polymer. Frequently, the repeating units bearing at least one functional group of the formula (I) contribute to at least 50% by weight, in particular at least 60% by weight and especially at least 70% by weight, e.g. from 50 to 95% by weight, in particular from 60 to 95% by weight and especially from 70 to 95% by weight, based on the total amount of repeating units bearing at least one functional group of the formula (I) and repeating units of monomers M2.

Besides the repeating units of monomers M1, repeating units of polymerized monomers bearing at least one functional group of the formula (I) and optionally monomers repeating units of monomers M2, the polymer carbon backbone may comprise repeating units of one or more non-ionic monomers M3, which are different from the aforementioned repeating units.

Suitable monomers M3 include, but are not limited to monoethylenically unsaturated monomers M3.1, which bear keto groups or aldehyde groups, in particular in the form of groups of the formulae (II) and (III) as described above. In particular, these monomers can be described by the following formulae (II') and (III')

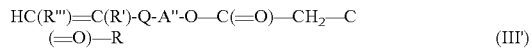

where Q, A', A" and R are as defined for formulae (II) and (III), respectively and where R' is hydrogen, $C_1$-$C_4$ alkyl or phenyl, and in particular hydrogen or methyl, and R''' is hydrogen, $C_1$-$C_4$ alkyl or phenyl and where R''' is in particular hydrogen, and where Q, A', A" and R have in particular the following meanings:

Q is C(=O)O or C(=O)NH;
A' is 2-methyl-1,2-propandiyl or 1-methyl-1,2-propandiyl;
A" is 1,2-ethandiyl;
R is $C_1$-$C_3$ alkyl and especially methyl.

In particular, the monomers of formula (II') correspond to the compounds of the formulae (IIa') or (IIb'):

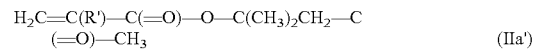

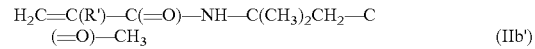

where R' is as defined for formula (II') and R' is in particular hydrogen or methyl.

In particular, the monomers of formula (III') correspond to the compounds of the formulae (IIIa') or (IIIb'):

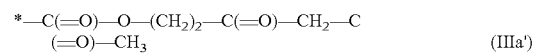

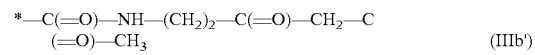

where R' is as defined for formula (II') and R' is in particular hydrogen or methyl.

The total amount of monomers M3.1 is frequently at most 10% by weight, in particular at most 8% by weight and especially at most 5% by weight, based on the total amount of monomers M, which form the polymer contained in the acrylic polymer latex.

Frequently, the total amount of monomers M3.1 is in the range of 0.1 to 10% by weight, in particular in the range of 0.2 to 8% by weight and especially in the range of 0.5 to 5% by weight, based on the total amount of monomers M, which form the polymer contained in the acrylic polymer latex.

Instead of or in addition to monomers M3.1, the further non-ionic monomers M3 may include one or more of the monomers different from monomers M3.1. Examples of further monomers M3 include, but are not limited to primary amides of monoethylenically unsaturated monocarboxylic acids having 3 to 8 carbon atoms (monomers M3.2), such as acrylamide and methacrylamide;

N—$C_1$-$C_{10}$ alkyl amides of monoethylenically unsaturated monocarboxylic acids having 3 to 6 carbon atoms (monomers M3.3), in particular N—$C_1$-$C_{10}$ alkyl amides of acrylic acid or methacrylic acid, such as N-methyl acrylamide, N-ethyl acrylamide, N-propyl acrylamide, N-isopropyl acrylamide, N-butyl acrylamide, N-methyl methacrylamide, N-ethyl methacrylamide, N-propyl methacrylamide, N-isopropyl methacrylamide and N-butyl methacrylamide;

monoethylenically unsaturated monomers bearing urea group (Monomers M3.4), such as 2-(2-oxo-imidazolidin-1-yl)ethyl (meth)acrylate, 2-ureido (meth)acrylate, N-[2-(2-oxooxazolidin-3-yl)ethyl] methacrylate;

hydroxyalkyl esters of monoethylenically unsaturated $C_3$-$C_6$ monocarboxylic acids (monomers M3.5), especially hydroxyalkyl esters of acrylic acid and hydroxyalkyl esters of methacrylic acid, also referred to hereinafter as hydroxyalkyl (meth)acrylates, in particular hydroxy-$C_2$-$C_4$-alkylesters of acrylic acid and hydroxy-$C_2$-$C_4$-alkylesters of methacrylic acid, such as 2-hydroxyethyl acrylate, 3-hydroxypropyl acrylate, 4-hydroxybutyl acrylate, 2-hydroxyethyl methacrylate, 3-hydroxypropyl methacrylate, 4-hydroxybutyl methacrylate, etc.

monoethylenically unsaturated monomers which bear at least one tri-$C_1$-$C_4$-alkoxysilane group (monomers M3.6), such as vinyl trimethoxysilane, vinyl triethoxysilane, methacryloxyethyl trimethoxysilane, methacryloxyethyl triethoxysilane, and mixtures thereof. The amount of said monomers M3.6 will frequently be in the range from 0.01 to 1 pphm.

Monomers M3 may also include a small amount of multiethylenically unsaturated monomers (monomers M3.7), i.e. monomers having at least 2 non-conjugated ethylenically unsaturated double bounds. The amounts of said monomers M3.6 will generally not exceed 1 pphm.

Examples of suitable monomers M3.7 include:

Diesters of monoethylenically unsaturated $C_3$-$C_6$ monocarboxylic acids with saturated aliphatic or cycloaliphatic diols, in particular diesters of acrylic acid or methacrylic acid, such as the diacrylates and the dimethacrylates of ethylene glycol (1,2-ethanediol), propylene glycol (1,2-propanediol), 1,2-butanediol, 1,3-butanediol, 1,4-butanediol, neopentyl glycol (2,2-dimethyl-1,3-propanediol) or 1,2-cyclohexanediol;

monoesters of monoethylenically unsaturated $C_3$-$C_6$ monocarboxylic acids with monoethylenically unsaturated aliphatic or cycloaliphatic monohydroxy compounds, such as the acrylates and the methacrylates of vinyl alcohol (ethenol), allyl alcohol (2-propen-1-ol), 2-cyclohexen-1-ol or norbornenol and divinyl aromatic compounds, such as 1,3-divinyl benzene, 1,4-divinyl benzene and mixtures thereof.

Frequently, the monomers M do not comprise monomers M3.7 or not more than 0.1% by weight of monomers M3.7, based on the total amount of monomers M.

The total amount of monomers M3 is frequently at most 10% by weight, in particular at most 8% by weight and especially at most 5% by weight, based on the total amount of monomers M, which form the polymer contained in the acrylic polymer latex. Frequently, the total amount of monomers M3 is in the range of 0.1 to 10% by weight, in particular in the range of 0.2 to 8% by weight and especially in the range of 0.5 to 5% by weight, based on the total amount of monomers M, which form the polymer contained in the acrylic polymer latex. Frequently, the monomers M3 do not comprise any monomers, which are different from monomers M3 or not more than 0.1% by weight of such further monomers M3, based on the total amount of monomers M.

For the use in compositions for flexible roofing, it has been found beneficial, if the acrylic polymer latex of the invention has a pH of at least pH 8, in particular in the range of pH 8 to pH 11, especially in the range from pH 8 to pH 10. In contrast to conventional latexes used in the field, no additional base will be required to adjust the pH to this range, as the groups of formula (I) provide sufficient basicity for achieving this pH range. However, additional base may not be detrimental, provided the pH is in the above range. Suitable base include organic amines, alkali hydroxides and ammonium hydroxide. Preferably, the aqueous acrylic polymer latexes of the invention contains less than 0.1% by weight, in particular less than 0.05% by weight, based on the total weight of the polymer latex, of volatile base, especially no volatile base such as ammonia or organic amines. Preferably, the aqueous acrylic polymer latexes of the invention contains less than 0.1% by weight, based on the total weight of the polymer latex, of polyalkylene imines or modified polyalkyleneimine or other water-soluble polymeric amines.

Preferably, the aqueous acrylic polymer latexes of the invention has a low VOC content and contains in particular less than 0.1% by weight, in particular less than 0.05% by weight of volatile organic compounds. The "VOC content" as herein referred to relates to the total concentration of volatile organic compounds as determined in accordance with DIN ISO 11890-2:2013-07.

As stated above, the present invention in particular relates to an aqueous acrylic polymer latex, which is obtained by a method which comprises reacting a carboxylated acrylic polymer latex with at least one aziridine compound selected from aziridine, 2-methylaziridine and mixtures of aziridine and 2-methylaziridine.

The polymer of the carboxylated acrylic polymer latex is formed by polymerized ethylenically unsaturated monomers M, which comprise acrylic monomers and from 0.1 to 10% by weight, based on the total weight of the monomers M, which form the carboxylated acrylic polymer latex of at least one ethylenically unsaturated monomer M2 having 1 or 2 carboxyl groups.

The carboxylated acrylic polymer latex, or more precisely the dispersed polymer contained in the carboxylated acrylic polymer latex, has a glass transition temperature $T_g$, which does not exceed $-10°$ C. and which preferably does not exceed $-20°$ C. In particular, the glass transition temperature $T_g$ of the carboxylated acrylic polymer latex will not be lower than $-60°$ C. and is in particular in the range from $-10$ to $-50°$ C. and especially in the range from $-20$ to $-45°$ C. If the carboxylated acrylic polymer latex contains two or more different polymers having different glass transition temperatures, e.g. in case of a mixture of two or more latexes or in case of multi-stage polymer latex, the weight average of the glass transition temperatures of these polymers does not exceed $-10°$ C. and in particular does not exceed $-20°$ C. and is in particular in the range from $-10$ to $-50°$ C. and especially in the range from $-20$ to $-45°$ C.

In the aqueous carboxylated acrylic polymer latex, the dispersed polymers are in the form of polymer particles. The polymer particles in the carboxylated acrylic polymer latex typically have a weight-average diameter $D_w$ in the range from 50 to 1000 nm, in particular in the range from 60 to 500 nm and especially in the range from 80 to 350 nm.

It is apparent that the type and relative amount of monomers M forming the carboxylated acrylic polymer latex correspond to the type and relative amount of monomers M in the acrylic polymer latex of the present invention, except for the relative amount of monomers M2, as the majority of monomers M2 will be converted by the reaction with the aziridine compound. In particular, the monomers M forming carboxylated acrylic polymer latex will comprise the same type and amount of monomers M1 as the monomers M forming the acrylic polymer latex, in particular a mixture of monomers M1a and M1b as defined above. In particular, the monomers M forming carboxylated acrylic polymer latex will comprise the same type and amount of monomers M3 as the monomers M forming the acrylic polymer latex, which are in particular selected from monomers M3.1.

In particular, the monomers M forming the aqueous carboxylated acrylic polymer latex comprise or consist of:

from 80 to 99.9% by weight, in particular from 85 to 99.5% by weight, especially from 90 to 99.0% by weight, based on the total weight of the monomers M, of at least one non-ionic monomer M1a, which is selected from $C_1$-$C_{20}$-alkyl esters of acrylic acid, or a mixture of at least one non-ionic monomer M1a with at least one further non-ionic monomer M1b, which is selected from $C_1$-$C_{20}$-alkylesters of methacrylic acid, and mono vinyl aromatic hydrocarbon monomers and mixtures thereof, where the monomer M1a is in particular selected from $C_1$-$C_{10}$-alkyl esters of acrylic acid and where the monomer M1b is in particular selected from $C_1$-$C_{10}$-alkyl esters of acrylic acid and styrene and mixtures thereof;

from 0.1 to 10% by weight, in particular from 0.5 to 8% by weight, especially from 1 to 5% by weight, based on the total weight of the monomers M, of at least one monoethylenically unsaturated monomer M2, which is selected from monoethylenically unsaturated monocarboxylic acids having 3 to 6 carbon atoms and monoethylenically unsaturated dicarboxylic acids having 4 to 6 carbon atoms, where the monomer M2 is in particular selected from monoethylenically unsaturated monocarboxylic acids having 3 to 6 carbon atoms and especially from acrylic acid or methacrylic acid, optionally 0 to 10% by weight, e.g. from 0.1 to 10% by weight, in particular from 0.2 to 8% by weight and especially from 0.5 to 5% by weight, based on the total weight of the monomers M, of at least one or more non-ionic monomers M3, which are different from monomers M1, especially a monomer M3 selected from monomers M3.1.

In a preferred group of embodiments, the monomers M forming the aqueous carboxylated acrylic polymer latex comprise or consist of:

from 60 to 89.9% by weight, in particular from 70 to 89.5% by weight, especially from 75 to 89% by weight, based on the total weight of the monomers M, of at least one non-ionic monomer M1a, which is selected from $C_2$-$C_{10}$-alkyl esters of acrylic acid, in particular from $C_2$-$C_{10}$-alkyl esters of acrylic acid, different from tert.-butyl acrylate;

from 10 to 29.9% by weight, in particular from 10 to 22.5% by weight, especially from 10 to 19% by weight, based on the total weight of the monomers M, of at least one non-ionic monomer M1b, which is selected from $C_1$-$C_4$-alkyl esters of methacrylic acid, such as methyl methacrylate, and styrene and mixtures thereof, with particular preference given to $C_1$-$C_4$-alkyl esters of methacrylic acid, such as methyl methacrylate, as monomer M1b; and from 0.1 to 10% by weight, in particular from 0.5 to 8% by weight, especially from 1 to 5%, based on the total weight of the monomers M, of at least one monoethylenically unsaturated monomer M2, which is selected from monoethylenically unsaturated monocarboxylic acids having 3 to 6 carbon atoms, especially from acrylic acid and methacrylic acid, the total amount of monomers M1a and M1b being in particular in the range from 80 to 99.9% by weight, in particular from 85 to 99.5% by weight, especially from 90 to 99.0% by weight, based on the total weight of the monomers M.

In another preferred group of embodiments, the monomers M forming the aqueous carboxylated acrylic polymer latex comprise or consist of:

from 60 to 89.9% by weight, in particular from 70 to 89.5% by weight, especially from 75 to 89% by weight, based on the total weight of the monomers M, of at least one non-ionic monomer M1a, which is selected from $C_2$-$C_{10}$-alkyl esters of acrylic acid, in particular from $C_2$-$C_{10}$-alkyl esters of acrylic acid, different from tert.-butyl acrylate;

from 10 to 29.8% by weight, in particular from 10 to 22.3% by weight, especially from 10 to 18% by weight, based on the total weight of the monomers M, of at least one non-ionic monomer M1b, which is selected from $C_1$-$C_4$-alkyl esters of methacrylic acid, such as methyl methacrylate and styrene and mixtures thereof, with particular preference given to $C_1$-$C_4$-alkyl esters of methacrylic acid, such as methyl methacrylate, as monomer M1b; and from 0.1 to 10% by weight, in particular from 0.5 to 8% by weight, especially from 1 to 5% by weight, based on the total weight of the monomers M, of at least one monoethylenically unsaturated monomer M2, which is selected from monoethylenically unsaturated monocarboxylic acids having 3 to 6 carbon atoms, 0.1 to 10% by weight, in particular from 0.2 to 8% by weight, especially from 0.5 to 5% by weight, based on the total weight of the monomers M, of at least one or more non-ionic monomers M3.1, which bears a keto group, which is in particular selected from the group consisting of monomers of formulae (II') and (III'), and which is especially selected from the group consisting of monomers of formulae (IIa'), (IIb'), (III'a) and (IIIb'), the total amount of monomers M1a and M1b being in particular in the range from 80 to 99.9% by weight, in particular from 85 to 99.5% by weight, especially from 90 to 99.0% by weight, based on the total weight of the monomers M.

The aqueous acrylic polymer latex of the invention and likewise the carboxylated acrylic polymer latex usually contain at least one surfactant for stabilizing the polymer particles in the latex against agglomeration or segregation. The surfactant is an emulsifier or protective colloids or mixtures thereof. Protective colloids, in contrast to emulsifiers, are understood to mean polymeric compounds having molecular weights above 2000 Daltons, whereas emulsifiers typically have lower molecular weights. Frequently, the surfactants are anionic or nonionic or mixtures of non-ionic and anionic surfactants.

Anionic surfactants usually bear at least one anionic group, which is selected from phosphate, phosphonate, sulfate and sulfonate groups. The anionic surfactants, which bear at least one anionic group, are typically used in the form of their alkali metal salts, especially of their sodium salts or in the form of their ammonium salts.

Preferred anionic surfactants are anionic emulsifiers, in particular those, which bear at least one sulfate or sulfonate group. Likewise, anionic emulsifiers, which bear at least one phosphate or phosphonate group may be used, either as sole anionic emulsifiers or in combination with one or more anionic emulsifiers, which bear at least one sulfate or sulfonate group.

Examples of anionic emulsifiers, which bear at least one sulfate or sulfonate group, are, for example, the salts, especially the alkali metal and ammonium salts, of alkyl sulfates, especially of $C_8$-$C_{22}$-alkyl sulfates, the salts, especially the alkali metal and ammonium salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40, the salts, especially the alkali metal and ammonium salts, of sulfuric monoesters of ethoxylated alkylphenols, especially of sulfuric monoesters of ethoxylated $C_4$-$C_{18}$-alkylphenols (EO level preferably 3 to 40), the salts, especially the alkali metal and ammonium salts, of alkylsulfonic acids, especially of $C_8$-$C_{22}$-alkylsulfonic acids, the salts, especially the alkali metal and ammonium salts, of dialkyl esters, especially di-$C_4$-$C_{18}$-alkyl esters of sulfosuccinic acid, the salts, especially the alkali metal and ammonium salts, of alkylbenzenesulfonic acids, especially of $C_4$-$C_{22}$-alkylbenzenesulfonic acids, and the salts, especially the alkali metal and ammonium salts, of mono- or disulfonated, alkyl-substituted diphenyl ethers, for example of bis(phenylsulfonic acid) ethers bearing a $C_4$-$C_{24}$-alkyl group on one or both aromatic rings. The latter are common knowledge, for example from U.S. Pat. No. 4,269,749, and are commercially available, for example as Dowfax® 2A1 (Dow Chemical Company).

Also suitable are mixtures of the aforementioned salts.

Preferred anionic surfactants are anionic emulsifiers, which are selected from the following groups:

the salts, especially the alkali metal and ammonium salts, of alkyl sulfates, especially of $C_8$-$C_{22}$-alkyl sulfates, the salts, especially the alkali metal salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40, of sulfuric monoesters of ethoxylated alkylphenols, especially of sulfuric monoesters of ethoxylated $C_4$-$C_{18}$-alkylphenols (EO level preferably 3 to 40), of alkylbenzenesulfonic acids, especially of $C_4$-$C_{22}$-alkylbenzenesulfonic acids, and of mono- or disulfonated, alkyl-substituted diphenyl ethers, for example of bis(phenylsulfonic acid) ethers bearing a $C_4$-$C_{24}$-alkyl group on one or both aromatic rings.

Examples of anionic emulsifies, which bear a phosphate or phosphonate group, include, but are not limited to the following salts, are selected from the following groups:

the salts, especially the alkali metal and ammonium salts, of mono- and dialkyl phosphates, especially $C_8$-$C_{22}$-alkyl phosphates, the salts, especially the alkali metal and ammonium salts, of phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20, the salts, especially the alkali metal and ammonium salts, of phosphoric monoesters of ethoxylated alkylphenols, especially phosphoric monoesters of ethoxylated $C_4$-$C_{18}$-alkylphenols (EO level preferably 3 to 40), the salts, especially the alkali metal and ammonium salts, of alkylphosphonic acids, especially $C_8$-$C_{22}$-alkylphosphonic acids and the salts, especially the alkali metal and ammonium salts, of alkylbenzenephosphonic acids, especially $C_4$-$C_{22}$-alkylbenzenephosphonic acids.

Further suitable anionic surfactants can be found in Houben-Weyl, Methoden der organischen Chemie [Methods of Organic Chemistry], volume XIV/1, Makromolekulare Stoffe [Macromolecular Substances], Georg-Thieme-Verlag, Stuttgart, 1961, p. 192-208.

Preferably, the surfactant comprises at least one anionic emulsifier, which bears at least one sulfate or sulfonate group. The at least one anionic emulsifier, which bears at least one sulfate or sulfonate group, may be the sole type of anionic emulsifiers. However, mixtures of at least one anionic emulsifier, which bears at least one sulfate or sulfonate group, and at least one anionic emulsifier, which bears at least one phosphate or phosphonate group, may also be used. In such mixtures, the amount of the at least one anionic emulsifier, which bears at least one sulfate or sulfonate group, is preferably at least 50% by weight, based on the total weight of anionic surfactants contained in the acrylic polymer latexes of the present invention and likewise in the the carboxylated acrylic polymer latexes. In particular, the amount of anionic emulsifiers, which bear at least one phosphate or phosphonate group does not exceed 20% by weight, based on the total weight of anionic surfactants contained in the acrylic polymer latexes of the present invention and likewise in the carboxylated acrylic polymer latexes.

As well as the aforementioned anionic surfactants, the surfactant may also comprise one or more non-ionic surface-active substances, which are preferably selected from non-ionic emulsifiers. Suitable nonionic emulsifiers are e.g. araliphatic or aliphatic non-ionic emulsifiers, for example ethoxylated mono-, di- and trialkylphenols (EO level: 3 to 50, alkyl radical: $C_4$-$C_{10}$), ethoxylates of long-chain alcohols (EO level: 3 to 100, alkyl radical: $C_8$-$C_{36}$), and polyethylene oxide/polypropylene oxide homo- and copolymers. These may comprise the alkylene oxide units copolymerized in random distribution or in the form of blocks. Very suitable examples are the EO/PO block copolymers. Preference is given to ethoxylates of long-chain alkanols (alkyl radical $C_1$-$C_{30}$, mean ethoxylation level 5 to 100) and, among these, particular preference to those having a linear $C_{12}$-$C_{20}$ alkyl radical and a mean ethoxylation level of 10 to 50, and also to ethoxylated monoalkylphenols.

In a particular embodiment of the invention, the surfactants comprise less than 20% by weight, especially not more than 10% by weight, of non-ionic surfactants, based on the total amount of surfactants contained in the acrylic polymer latexes of the present invention and likewise in the carboxylated acrylic polymer latexes, and especially the acrylic polymer latexes and likewise the carboxylated acrylic polymer latexes do not comprise any non-ionic surfactant. In another embodiment of the invention, the surfactants contained in the acrylic polymer latexes of the present invention and likewise in the carboxylated acrylic polymer latexes comprise at least one anionic surfactant and at least one non-ionic surfactant, the ratio of anionic surfactants to non-ionic surfactants being frequently in the range form 0.5:1 to 10:1, in particular from 1:1 to 5:1.

Preferably, the total amount of surfactant contained in the acrylic polymer latexes of the present invention and likewise in the carboxylated acrylic polymer latexes is in the range from 0.2% to 5% by weight, especially in the range from 0.5% to 3% by weight, based on the total weight of polymer contained in the respective polymer latex.

The acrylic polymer latexes of the present invention and likewise the carboxylated acrylic polymer latexes will usually have a solids content in the range from 20 to 65% by weight, in particular in the range from 30 to 60% by weight.

The dynamic viscosity of the acrylic polymer latexes of the present invention and likewise the carboxylated acrylic polymer latexes will usually be in the range from 20 to 2000 mPas, as determined in accordance with DIN EN IS 2555: 2000-01 at 20° C. and a shear rate of $100^{-1}$.

As stated above, the aqueous acrylic polymer latexes of the present invention are prepared by a method, which comprises reacting a carboxylic acrylic polymer latex with at least one aziridine compound selected from aziridine, 2-methylaziridine and mixtures of aziridine and 2-methylaziridine. Preferred aziridine compound is the unsubstituted aziridine, which results in functional groups of formula (I), where A is ethan-1,2-diyl, i.e. $CH_2CH_2$.

By the reaction of the carboxyl groups with the aziridine compound the groups of formula (I) are formed. The amount of the aziridine compound is chosen such that the molar ratio of aziridine compound to carboxyl groups present in the carboxylated latex is at least 0.1:1, preferably at least 0.5:1, especially at least 1:1, e.g. in the range from 0.1:1 to 5:1, in particular in the range from 0.5:1 to 5:1 and especially in the range from 1:1 to 5:1 or 1.1:1 to 5:1. The molar amount of carboxyl groups contained in the carboxylated acrylic polymer latex can be easily determined by titration of the carboxyl groups and it can also be calculated from the relative amount of monomers M2 used for preparing the carboxylated acrylic polymer latex.

The reaction of the carboxylated acrylic polymer latex with at least one aziridine compound can be easily performed by mixing the carboxylated acrylic polymer latex with the aziridine compound in the respective amounts. Frequently, the aziridine compound is added to a reaction vessel containing the carboxylated acrylic polymer latex. Mixing is usually accompanied by agitation, in particular stirring.

In the process of the invention, the aziridine compound can be used as such. Preferably, the aziridine compound is used as a solution, in particular as an aqueous solution. Usually, the concentration of the aziridine compound in such a solution is in the range of 20 to 80% by weight, in particular from 30 to 70% by weight.

The reaction of the carboxylated acrylic polymer latex with at least one aziridine compound is usually performed at a temperature in the range from 10 to 100° C., in particular in the range from 30 to 95° C. and especially in the range from 50 to 90° C.

The pH of the carboxylated acrylic polymer latex used in the reaction with the aziridine compound may vary and will usually be at least pH 3 and especially at least pH 4. Strong alkalinity is not required and preferably the pH of the carboxylated acrylic polymer latex will not exceed pH 8. In particular, the pH of the carboxylated acrylic polymer latex used in the reaction with the aziridine compound is in the range from pH 3 to pH 8, in particular in the range from pH 4 to pH 7.

The time required for the reaction may depend on the reaction temperature, the concentration of the reactants and the pH of the carboxylated polymer latex. A skilled person can easily determine the time required for the reaction of the carboxylated acrylic polymer latex with the aziridine compound by routine experiments. Usually, the reaction time will be in the range from 1 to 18 h, in particular from 3 to 12 h to guarantee complete conversion of the aziridine compound.

The carboxylated acrylic polymer latexes are principally known and are usually prepared by free radical aqueous emulsion polymerization of the monomers M, which form the carboxylated polymer latex in the presence of at least one surfactant and at least one polymerization initiator.

The conditions required for the performance of the free-radical emulsion polymerization of the monomers M are sufficiently familiar to those skilled in the art, for example from the prior art cited at the outset and from "Emulsionspolymerisation" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer [Dispersions of Synthetic High Polymers], F. Hölscher, Springer-Verlag, Berlin (1969).

The free-radically initiated aqueous emulsion polymerization is triggered by means of a free-radical polymerization initiator (free-radical initiator). These may in principle be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides, such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2'-azobis(amidinopropyl) dihydrochloride (AIBA corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

In general, the amount of the free-radical initiator used, based on the total amount of monomers M, which form the carboxylated acrylic polymer latex, is 0.01 pphm to 5 pphm, preferably 0.1 pphm to 3 pphm.

The amount of free-radical initiator required for the emulsion polymerization of the monomers M can be initially charged in the polymerization vessel completely. However, it is also possible to charge none of or merely a portion of the free-radical initiator, e.g. not more than 30% by weight, especially not more than 20% by weight, based on the total amount of the free-radical initiator required in the aqueous polymerization medium and then, under polymerization conditions, during the free-radical emulsion polymerization of the monomers M to add the entire amount or any remaining residual amount according to the consumption, batch wise in one or more portions or continuously with constant or varying flow rates.

More particularly, it has been found to be suitable to establish the polymerization conditions and to initially charge at least a portion of the free-radical initiator into the polymerisation vessel bevor the metering of the monomers M is started.

For the free-radically initiated aqueous emulsion polymerization the monomers M can be initially charged entirely in the reaction vessel or be fed in over the course of polymerization. More particularly, it has been found to be useful to add the majority of the monomers M, especially at least 95% by weight, or the entirety of the monomers M to the polymerization reaction under polymerization conditions. Preferably, the monomers M are added over a period of at least 30 minutes, especially over a period of 0.5 to 10 h and particularly over a period of 1 to 5 h. The monomers M can be added in substance or preferably in the form of an aqueous emulsion. Preferably, the monomers M are added continuously at constant flow rates. Preferably, the entirety of the monomers M is metered in as a monomer mixture of the monomers M1 and M2, especially advantageous in the form of an aqueous monomer emulsion.

During the addition of the monomers M, the type of monomers and/or the relative amounts thereof can be altered continuously or stepwise. However, it is also possible that the type and relative amounts of monomers M, which are added to the polymerization reaction remain constant. For example, it is possible that the ratio of monomers M1 and M2 increases or decreases during the addition. However, it was found beneficial, if the monomers M2 are added during the addition of monomers M1 that the period for the addition of monomers M2 is at least 30% of the period for the addition of monomers M1. Different monomers may be added to the polymerization reaction via different feeds. However, it is beneficial to mix the monomers M beforehand.

It has been found advantageous to perform the free-radical emulsion polymerization in the presence of a seed latex. A seed latex is a polymer latex which is present in the aqueous polymerization medium before the metering of the monomers M is started. The seed latex may help to better adjust the particle size or the final polymer latex obtained in the free-radical emulsion polymerization of the invention.

Principally every polymer latex may serve as a seed latex. For the purpose of the invention, preference is given to seed latices, where the particle size of the polymer particles is comparatively small. In particular, the Z average particle diameter of the polymer particles of the seed latex, as determined by dynamic light scattering at 20° C. (see below) is preferably in the range from 10 to 80 nm, in particular from 10 to 50 nm. Preferably, the polymer particles of the seed latex is made of ethylenically unsaturated monomers, which comprise at least 95% by weight, based on the total weight of the monomers forming the seed latex, of one or more monomers M1 as defined above. In the polymer particles of the seed latex particular comprises at least 95% by weight, based on the total weight of the monomers forming the seed latex, of at least one monomer M1b or of a mixture of at least one monomer M1b and one or more monomers M1a, where the proportion of monomers M1b to M1a is at least 50% on a weight basis.

For this, the seed latex is usually charged into the polymerisation vessel before the metering of the monomers M is started. In particular, the seed latex is charged into the polymerisation vessel followed by establishing the polymerization conditions and charging at least a portion of the free-radical initiator into the polymerisation vessel before the metering of the monomers M is started.

The amount of seed latex, calculated as solids, may frequently be in the range from 0.1 to 10% by weight, in particular from 0.5 to 5% by weight, based on the total weight of the monomers M to be polymerized.

The free-radical aqueous emulsion polymerization of the invention can be conducted at temperatures in the range from 0 to 170° C. Temperatures employed are generally in the range from 50 to 120° C., frequently 60 to 120° C. and often 70 to 110° C. The free-radical aqueous emulsion polymerization of the invention can be conducted at a pressure of less than, equal to or greater than 1 atm (atmospheric pressure), and so the polymerization temperature may exceed 100° C. and may be up to 170° C. Polymerization of the monomers is normally performed at ambient pressure, but it may also be performed under elevated pressure. In this case, the pressure may assume values of 1.2, 1.5, 2, 5, 10, 15 bar (absolute) or even higher values. If emulsion polymerizations are conducted under reduced pressure, pressures of 950 mbar, frequently of 900 mbar and often 850 mbar (absolute) are established. Advantageously, the free-radical aqueous emulsion polymerization of the monomers M, which form the carboxylated acrylic polymer latex, is conducted at ambient pressure (about 1 atm) with exclusion of oxygen, for example under an inert gas atmosphere, for example under nitrogen or argon.

The polymerization of the monomers M can optionally be conducted in the presence of chain transfer agents. Chain transfer agents are understood to mean compounds that transfer free radicals and which reduce the molecular weight or control chain growth in the polymerization. Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and the isomeric compounds thereof, n-octanethiol and the isomeric compounds thereof, n-nonanethiol and the isomeric compounds thereof, n-decanethiol and the isomeric compounds thereof, n-undecanethiol and the isomeric compounds thereof, n-dodecanethiol and the isomeric compounds thereof, n-tridecanethiol and isomeric compounds thereof, substituted thiols, for example 2-hydroxyethanethiol, aromatic thiols, such as benzenethiol, ortho-, meta- or para-methylbenzenethiol, alkylesters of mercaptoacetic acid (thioglycolic acid), such as 2-ethylhexyl thioglycolate, alkylesters of mercaptopropionic acid, such as octyl mercapto propionate, and also further sulfur compounds described in Polymer Handbook, 3rd edition, 1989, J. Brandrup and E. H. Immergut, John Wiley & Sons, section II, pages 133 to 141, but also aliphatic and/or aromatic aldehydes such as acetaldehyde, propionaldehyde and/or benzaldehyde, unsaturated fatty acids, such as oleic acid, dienes having nonconjugated double bonds, such as divinylmethane or vinylcyclohexane, or hydrocarbons having readily abstractable hydrogen atoms, for example toluene. Alternatively, it is possible to use mixtures of the aforementioned chain transfer agents that do not disrupt one another. The total amount of chain transfer agents optionally used in the process of the invention, based on the total amount of monomers M, will generally not exceed 1% by weight.

The free-radically initiated aqueous emulsion polymerization of the monomers M is naturally effected in an aqueous polymerization medium. The aqueous polymerization medium may in principle comprise minor amounts (≤5% by weight) of water-soluble organic solvents, for example methanol, ethanol, isopropanol, butanols, pentanols, but also acetone, etc. Preferably, however, the free-radically initiated aqueous emulsion polymerization of the monomers M is conducted in the absence of such solvents.

The aqueous polymerization medium will, however, contain at least one surfactant. As the surfactants remain in the aqueous carboxylated acrylic polymer latex formed during the emulsion polymerization, the surfactants used for emulsion polymerization will usually correspond to the surfactants contained in the final carboxylated acrylic polymer latex. Preferably, the surfactant will be used in such an amount that the amount of surfactant is in the range from 0.2% to 5% by weight, especially in the range from 0.5% to 3% by weight, based on the monomers M to be polymerized.

It is frequently advantageous when the aqueous polymer dispersion obtained on completion of free-radically initiated aqueous emulsion polymerization is subjected to an after-treatment in order to reduce the residual monomer content. This after-treatment is effected either chemically, for example by completing the polymerization reaction using a more effective free-radical initiator system (known as post-polymerization), and/or physically, for example by stripping the aqueous polymer dispersion with steam or inert gas. Corresponding chemical and physical methods are familiar to those skilled in the art—see, for example, EP-A 771328, DE-A 19624299, DE-A 19621027, DE-A 19741184, DE-A 19741187, DE-A 19805122, DE-A 19828183, DE-A 19839199, DE-A 19840586 and DE-A 19847115. The combination of chemical and physical aftertreatment has the advantage that it removes not only the unconverted ethylenically unsaturated monomers, but also other disruptive volatile organic constituents (VOCs) from the aqueous polymer dispersion.

According to the invention, the acrylic polymer latexes are particularly useful as binders in coating compositions for providing flexible roofing.

These coating compositions are usually aqueous and contain, besides at least one aqueous acrylic polymer latex of the invention at least one inorganic particulate material selected from inorganic pigments, inorganic fillers and mixtures thereof.

The inventive coating compositions contain the inorganic particular material usually in such amounts that the coating composition has pigment volume concentration pvc of at least 10. Frequently, the pvc will not exceed a value of 50 and is preferably in the range from 15 to 50 and specifically in the range from 20 to 45. The pvc describes the ratio of the volume of pigments ($V_P$) and fillers ($V_F$) relative to the total volume, consisting of the volumes of binder ($V_B$, pigments and fillers in a dried coating film in percent:

$$pvc=(V_P+V_F)\times 100/(V_P+V_F+V_B).$$

Suitable pigments are, for example, inorganic white pigments, such as titanium dioxide, preferably in the rutile form, barium sulfate, zinc oxide, zinc sulfide, basic lead carbonate, antimony trioxide, lithopone (zinc sulfide+barium sulfate), or colored pigments, for example iron oxides, carbon black, graphite, zinc yellow, zinc green, ultramarine, manganese black, antimony black, manganese violet, Prussian blue or Paris green. In addition to the inorganic pigments, the coating compositions of the invention may also comprise organic color pigments, for example sepia, gamboge, Cassel brown, toluidine red, para red, Hansa yellow, indigo, azo dyes, anthraquinonoid and indigoid dyes, and also dioxazine, quinacridone pigments, phthalocyanine pigments, isoindolinone pigments and metal complex pigments. Also suitable are synthetic white pigments with air inclusions to enhance light scattering, such as the Ropaque® and AQACell® dispersions. Additionally suitable are the Luconyl® brands from BASF SE, for example Luconyl® yellow, Luconyl® brown and Luconyl® red.

The total concentration of pigments in the aqueous coating composition, if present, is frequently in the range from 1 to 25% by weight, in particular from 2 to 15% by weight, based on the total weight of the coating composition.

Examples of suitable fillers are silicates, in particular alumosilicates, alkalimetal silicates and earth alkaline silicates, such as feldspars, kaolin, talc, micas, magnesite, alkaline earth metal carbonates, such as calcium carbonate, for example in the form of natural calcium carbonate, e.g. calcite or chalk, magnesium carbonate, dolomite, or synthetic calcium carbonate, alkaline earth metal sulfates, such as calcium sulfate, silicon dioxide, etc. In the coating compositions of the invention, finely divided fillers are naturally preferred. Frequently, the fillers will have a particle diameter of 0.1 to 25 µm, which means that in particular at least 90% by weight of the particles of the filler have a particle size in this range. The weight average particle diameter as determined by laser diffraction in accordance to ISO 13320:2009 is frequently in the range from 0.2 to 20 µm. The fillers may be used in the form of individual components. In practice, however, filler mixtures have been found to be particularly useful, for example calcium carbonate/kaolin, calcium carbonate/talc.

Fillers may also be flatting agents which significantly impair the gloss as desired. Flatting agents are generally transparent and may be either organic or inorganic. Examples of flatting agents are inorganic silicates, for example the Syloid® brands from W. R. Grace & Company and the Acematt® brands from Evonik GmbH. Organic flatting agents are obtainable, for example, from BYK-Chemie GmbH under the Ceraflour® brands and the Ceramat® brands, and from Deuteron GmbH under the Deuteron MK® brand.

Preferably, the coating compositions of the invention contain at least one filler selected from natural calcium carbonates, synthetic calcium carbonates, calcium silicates and alkalimetal silicates. In particular, the main component or the total amount of the fillers contained in the coating composition is selected from the group consisting of natural calcium carbonates, synthetic calcium carbonates, calcium silicates and alkalimetal silicates and mixtures thereof.

In particular, it may be beneficial for the purpose of providing flexible roofing, if the inorganic filler comprises an effective amount of particles, which have a particle size of below 2 µm, in particular of at most 1.8 µm and especially of at most 1.5 µm, e.g. in the range from 0.1 to <2 µm, in particular in the range from 0.1 to 1.8 µm, especially in the range from 0.3 to 1.5 µm. Such finely divided fillers are for example calcium carbonates with an average particle size of less than 2 µm. Generally, these fillers are commercially available in the form of slurries, i.e. in the form of aqueous dispersions, which allows an easy handling. Suitable calcium carbonate slurries are for example obtainable from the company Omya, Offringen, Switzerland under the trade name Hydrocarb, e.g. Hydrocarb 95 with an average particle size of 0.7 μm.

In particular it was found beneficial, if the inorganic filler comprises, based on the total amount of the filler, at least 50% by weight, more particularly at least 80% by weight or at least 90% by weight of particles, which have a particle size of below 2 μm, in particular of at most 1.8 μm and especially of at most 1.5 μm, e.g. in the range from 0.1 to <2 μm, in particular in the range from 0.1 to 1.8 μm, especially in the range from 0.3 to 1.5 μm. Of course, a mixture of fillers, which differ in average particle sizes can be used, e.g. a mixture of a first filler, wherein at least 90% by weight of the particles have a particle size in the range from 0.1 to <2 μm, in particular in the range from 0.1 to 1.8 μm, especially in the range from 0.3 to 1.5 μm, and a second filler, wherein at least 90% by weight of the particles have a particle size in the range from 2 to 25 μm, in particular in the range from 2 to 10 μm, especially in the range from 3 to 10 μm. In this case, the weight ratio of the first filler to the second filler is preferably in the range from 1:9 to 9:1, in particular in the range from 1:1 to 9:1 and especially in the range from 4:1 to 9:1.

The total concentration of filler in the aqueous coating composition is frequently in the range from 10 to 50% by weight, in particular from 20 to 45% by weight, based on the total weight of the coating composition.

Preferably, the coating composition contains at least one inorganic pigment and at least one filler, in particular at least one filler in the aforementioned amounts. In particular, the coating composition contains at least one inorganic white pigment and at least one filler, in particular at least one filler in the aforementioned amounts. Preferably, the inorganic white pigment is titanium dioxide, in particular in the rutile form.

In particular, the amount of filler exceeds the amount of pigment. In particular, the weight ratio of filler to pigment is at least 2:1, especially at least 3:1 and in particular in the range from 2:1 to 15:1, especially in the range from 3:1 to 10:1.

The coating compositions of the invention may contain customary auxiliaries, including e.g. one or more of the following:
dispersants,
in-can preservatives, and/or film preservatives,
thickeners,
defoamers,
flow promoters, and
antifreeze agents.

Dispersants are, for example, sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof. Generally speaking, the amount of dispersant used is 0.5% to 6%, preferably 1% to 3% by weight, based on the amount of pigment and/or filler.

Suitable thickeners are, for example, associative thickeners, such as polyurethane thickeners. The amount of the thickener is generally less than 2.5% by weight and more preferably less than 1.5% by weight of thickener, and especially 0.05% to 1% by weight, based on the solids content of the coating composition.

Suitable defoamers include polydimethylsiloxanes, aqueous wax dispersions and acetylenic diols, such as TMDD.

Suitable in-can preservatives and film preservatives are in particular fungicides, algicides and bactericides, which prevent microbial spoilage of the coating composition and formation of algae on the coating.

Suitable antifreeze agents include water miscible organic solvents, especially aliphatic alcohols, such as ethanol, isopropanol, butanol, ethylene glycol, propylene glycol and glycerin.

Furthermore, the coating composition of the invention may contain additives, which result in crosslinking: Such additives include compounds, which act as a photoinitiator for the purpose of crosslinking upon exposure of the coating to electromagnetic radiation, including aromatic ketones, such as benzophenones, according to DE-A 38 27 975. Further crosslinking additives are the aforementioned crosslinkers, such as water-soluble dihydrazides, according to DE-A 39 01 073, when the acrylic polymer latex comprises carbonyl or aldehyde groups.

The coating compositions of the invention are produced in a known way by blending the components in mixing devices customary for the purpose. It has been found appropriate to prepare an aqueous paste or dispersion from the pigments, fillers, water, and optionally the auxiliaries, and only then to mix the polymeric binder—that is, in general, the aqueous acrylic polymer latex—with the pigment paste or pigment dispersion.

The coating compositions of the invention contain in general 30 to 75% by weight and preferably 40 to 70% by weight of nonvolatile constituents. By these are meant all constituents of the preparation that are not water, but at least the total amount of binder, pigment, and auxiliary, based on the solids content of the coating compositions. The volatile constituents are primarily water. Preferably, the coating compositions of the invention do not contain more than 2% by weight, in particular less than 1% by weight of organic volatiles.

The coating compositions of the invention are notable for ease of handling, good storage stability and good processing properties. They have good performance properties, including for example early rain fastness, quick setting, good flexibility, such as high elongation at break, and sufficient rigidity, good water resistance, small water uptake. Moreover, the coating compositions have usually high wet adhesion, and they exhibit good flow on application. Moreover, the coating compositions frequently show good adherence to hydrophobic substrates, such as existing roofings based on organic polymers. Moreover, the equipment used can be easily cleaned with water.

The invention also relates to a method for providing a flexible roof coating on a flat roof. This method comprises applying a coating composition of the present invention to a flat roof, in particular to a roof having a slope or inclination of not more than 15°, especially of not more than 10° or not more than 5°. The material of the roof to which the coating composition is applied is not particularly limited, and includes metals, wood, concrete, fibre cement and roofs having already a roofing based on bitumen, tar paper or on organic polymers, including foliar flexible roofings based on polyurethane, PVC or EPDM or TPO and liquid roofings.

Application may take place in a conventional way, by spraying, troweling, knifing, rolling or pouring. The coating compositions of the invention can be applied to the surface of the flat roof within a wide temperature range, e.g. at a temperature in the range from 0 to 50° C., in particular at a temperature from 5 to 40° C.

EXAMPLES

Emulsifier 1: aqueous solution of sodium dodecyl diphenyl ether disulfonate (45% by weight), Dowfax™ 2A1 (Dow Chemicals);
Defoamer 1: blend of mineral oils, emulsifiers and silica derivatives, Drewplus® L 108 (Ashland Inc.);
Defoamer 2: based on mineral oil, polymer and non-ionic surfactants, Foamstar® ST 2412 (BASF SE):
Polyethyleneimine 1: polyethyleneimine having an average molecular weight of 800 g/mol and a water content of 1% by weight, Lupasol® FG (BASF SE);
Dispersant 1: anionic polyelectrolyte, Dispex® AA 4144 (BASF SE);
Pigment 1: titanium dioxide in the rutile form, Ti-Pure® R960 (Chemours/Du Pont), particle diameter of 0.5 µm;
Filler 1: calcium carbonate, DURAMITE® (Imerys Carbonates), particle diameter of 12 µm
Biocide 1: aqueous dispersion of 1,2-benzisothiazolin-3-one (20% by weight), Proxel® BD20 (Lonza Group);
Coalescent 1: 2,2,4-trimethyl-1,3-pentandiol monoisobutyrate, Texanol® (Eastman Chemical);
Thickener 1: water soluble hydroxyethylcellulose, Natrosol™ 250 MXR (Ashland Inc.).

Analytics 1.1 The solids content of the polymer latexes were determined by drying a defined amount of the aqueous polymer latex (about 2 g) to constant weight in an aluminum crucible having an internal diameter of about 5 cm at 120° C. in a drying cabinet (about 2 hours). Two separate measurements were conducted. The value reported in the example is the mean of the two measurements.
1.2 The particle diameter of the polymer latexes were determined by dynamic light scattering of an aqueous polymer dispersion diluted with deionized water to 0.001 to 0.5% by weight at 22° C. by means of a High Performance Particle Sizer (HPPS) from Malvern Instruments, England. What is reported is the cumulant Z average diameter calculated from the measured autocorrelation function (ISO Standard 13321).
1.3 The glass transition temperatures of the polymer latexes were determined by the DSC method (Differential Scanning calorimetry, 20 K/min, midpoint measurement, DIN 53765:1994-03) by means of a DSC instrument (Q 2000 series from TA instruments).
1.5 The pH values of the polymer latexes were determined by using a pH meter (handylab pH 11 of Schott Instruments).

Preparation of the Carboxylated Acrylic Polymer Latexes and Iminated Acrylic Polymer Latexes

Preparation Example 1 (Carboxylated Acrylic Polymer Latex PD1)

A 2-L polymerization vessel equipped with an anchor stirrer was charged with 3.94 g of a polystyrene seed (33% by weight aqueous dispersion, weight average particle diameter of 30 nm) and 233.2 g of deionized water. The apparatus was then flushed with nitrogen and the initial charge was heated to 85° C. At this temperature, 1.9 g of an aqueous solution of sodium peroxodisulfate (7% by weight) were added within 2 minutes and stirring was continued for 5 minutes. Afterwards, 12.1 g of the aqueous solution of sodium peroxodisulfate (7% by weight) were metered in at a constant feed rate over the course of 240 minutes. In parallel therewith, a monomer emulsion consisting of

| | |
|---|---|
| 183.6 g | deionized water, |
| 14.3 g | Emulsifier 1, |
| 427.1 g | n-butyl acrylate, |
| 13.0 g | methacrylic acid, |
| 87.4 g | methyl methacrylate, and |
| 122.5 g | 2-ethyl hexylacrylate | was metered in at a constant feed rate over the course of 240 minutes. After the end of the feeds, the feed vessel for the monomer emulsion was rinsed with 23.4 g of deionized water into the polymerization vessel. This was followed by stirring at 85° C. for 60 minutes. After adding 0.3 g of Defoamer 1, the dispersion was cooled to 80° C. and 5.5 g acetone bisulfite sodium salt and 8.5 g tert-butyl hyperoxide were metered in over the course of 60 minutes. The obtained latex was then cooled to 22° C. and 39.0 g of deionized water as well as 4.9 g of an aqueous solution of sodium hydroxide (10% by weight) were added slowly with stirring. This gave a polymer latex having a solids content of 56% by weight and a pH of 5. The weight average particle diameter was 225 nm.

Example 1 (Iminated Acrylic Polymer Latex D1)

500 g of the carboxylated acrylic polymer latex PD1, which was prepared as described in Preparation Example 1, were heated to 60° C. At this temperature, 4.7 g of an aqueous solution of ethyleneimine (60% by weight) was added dropwise, and the reaction mixture was then stirred for 6 hours. This gave an aqueous polymer latex having a solids content of 56.1% by weight, a pH of 9 and a glass transition temperature of −35° C. The weight average particle diameter was about 225 nm.

Example 2 (Iminated Acrylic Polymer Latex D2)

500 g of the carboxylated acrylic polymer latex PD1, which was prepared as described in Preparation Example 1, were heated to 60° C. At this temperature, 6.9 g of an aqueous solution of ethyleneimine (60% by weight) was added dropwise, and the reaction mixture was then stirred for 6 hours. This gave an aqueous polymer latex having a solids content of 56.1% by weight, a pH of 9 and a glass transition temperature of −35° C. The weight average particle diameter was about 225 nm.

Preparation Example 2 (Carboxylated Latex PD2)

The carboxylated acrylic polymer latex PD2 was prepared as described for Preparation Example 1, with the only exception that a monomer emulsion was used that consisted of:

| | |
|---|---|
| 183.6 g | deionized water, |
| 14.3 g | Emulsifier 1, |
| 414.1 g | n-butyl acrylate, |
| 13.0 g | methacrylic acid, |
| 87.4 g | methyl methacrylate, |
| 122.5 g | 2-ethyl hexylacrylate, and |
| 13.0 g | acetoacetoxyethyl methacrylate. |

This gave a polymer latex having a solids content of 56% by weight, a pH of 5 and a glass transition temperature of −35° C. The weight average particle diameter was 220 nm.

Example 3 (Iminated Acrylic Polymer Latex D3)

500 g of the carboxylated acrylic polymer latex PD2, which was prepared as described in Preparation Example 2, were heated to 60° C. At this temperature, 4.5 g of an aqueous solution of ethyleneimine (60% by weight) was added dropwise, and the reaction mixture was then stirred for 6 hours. This gave an aqueous polymer latex having a solids content of 54.7% by weight, a pH of 9.2 and a glass transition temperature of −35.5° C. The weight average particle diameter was about 220 nm.

Example 4 (Iminated Acrylic Polymer Latex D4)

500 g of the carboxylated acrylic polymer latex PD2, which was prepared as described in Preparation Example 2, were heated to 60° C. At this temperature, 6.9 g of an aqueous solution of ethyleneimine (60% by weight) was added dropwise, and the reaction mixture was then stirred for 6 hours. This gave an aqueous polymer latex having a solids content of 54.7% by weight, a pH of 9.2 and a glass transition temperature of −35.5° C. The weight average particle diameter was about 220 nm.

Comparative Example 1 (Polymer Latex CD1, not According to the Invention)

The pH value of 500 g of the carboxylated acrylic polymer latex PD1, which was prepared as described in Preparation Example 1, was adjusted to pH 11 by adding 15 g of an aqueous solution of ammonia (25% by weight). The thus obtained neutralized carboxylated acrylic polymer latex was then mixed with 2.7 g Polyethyleneimine 1 to give latex CD1. The weight average particle diameter was about 225 nm.

Comparative Example 2 (Polymer Latex CD2, not According to the Invention)

The pH value of 500 g of the carboxylated acrylic polymer latex PD2, which was prepared as described in Preparation Example 2, was adjusted to pH 11 by adding 15 g of an aqueous solution of ammonia (25% by weight). The thus obtained neutralized carboxylated acrylic polymer latex was then mixed with 2.7 g Polyethyleneimine 1 to give polymer latex CD2. The weight average particle diameter was about 220 nm.

Application Properties

The following coating formulations were used to determine the application properties of the above described polymer dispersions.

For preparing 1000 g of each coating formulation the following ingredients were homogeneously blended:

| | |
|---|---|
| 123.2 g | deionized water, |
| 4.2 g | Dispersant 1, |
| 1.3 g | potassium tripolyphosphate, |
| 3.6 g | propylene glycol, |
| 1.5 g | Defoamer 2, |
| 72.6 g | Pigment 1, |
| 359.9 g | Filler 1, and |
| 1.9 g | Biocide 1. |

Afterwards, the following components were successively added to the mixture:

400 g of the polymer latex D1, D2, D3, D4, PD1, PD2, CD1 or CD2, respectively, which were prepared as described in the Examples above, 14.7 g deionized water, 5.1 g Coalescent 1, 2.0 g aqueous solution of ammonia (28% by weight) and a premixed suspension consisting of 3.3 g of Thickener 1 and 7.3 g of propylene glycol.

Determination of Mechanical Properties

Polymer films were prepared with the above described coating formulations and then dried for 14 days. The tensile strengths and elongation at break curves of the thus obtained films were measured in accordance with ASTM D-6083. The results are summarized in Table 2 below.

Determination of the Water Absorption

Polymer films having a thickness of 0.7 mm were prepared by applying the coating formulations, which were prepared as described above, onto a Teflon surface. The formed films were dried for 7 day, then flipped over and dried for another 7 days. Subsequently round specimens weighing about 0.5 g were cut from the polymer films. After measuring their exact weights the specimens were submerged in water for 7 days. The specimens were then removed from the water and weighed again in the wet state. The weight increase relative to the original weight is given as water absorption in Table 2.

Determination of Yellowing

The color values L*, a* and b* of the films prepared from the coating formulations to be examined were measured with a desktop spectrophotometer (model X-Rite Ci7800 from X Rite Inc.). The results are summarized in Table 1:

TABLE 1

| Latex used for preparing the coating formulation | L* | a* | b* |
|---|---|---|---|
| PD1 | 96.41 | −0.70 | 2.91 |
| CD1 | 96.07 | −1.27 | 6.42 |
| D1 | 96.13 | −0.90 | 4.17 |
| D2 | 96.41 | −0.97 | 4.26 |
| PD2 | 96.43 | −0.69 | 3.06 |
| CD2 | 95.28 | −1.96 | 10.51 |
| D3 | 96.33 | −1.23 | 5.44 |
| D4 | 96.20 | −1.24 | 5.71 |

As can be seen from Table 1, the color changes of the films based on the polymer latexes D1 to D4 according to the invention relative to the films based on the carboxylated acrylic polymer latexes PD1 or PD2 were much lower than those of the respective films based on comparative polymer latexes CD1 or CD2. Accordingly, the films based on the inventive polymer latexes D1 to D4 have a significantly reduced tendency to yellow.

Determination of the Resistance Against Rain Immediately after the Coating Application (Shower Test)

The coating formulations to be tested are applied with a doctor blade to Leneta paper in a wet film thickness of 760 μm. The coatings were dried for 20 min. Each coating was then placed under a shower head and watered for a period of 20 min. Afterwards, the coatings were examined to determine, whether they had been washed off or remained intact. The results are summarized in Table 2.

Determination of the Storage Stability

Samples of the formulations to be examined are stored in glass containers at a temperature of 60° C. for 7 days. Afterwards, the samples were inspected visually. Changes in appearance, particular strong increases in viscosity or agglomeration were considered to indicate the respective formulations to be instable. The results are summarized in Table 2.

Determination of the Drying Rate

The polymer latexes to be tested were adjusted to solids content of 50% by weight and then applied with a doctor blade to Leneta paper in a wet film thickness of 250 µm. After a drying time of 15 min the degree of dryness was evaluated by manual palpation on a scale of 0 to 3, where 0, 1, 2 and 3 have the following meanings: 0: wet, 1: sticky wet, 2: sticky dry, 3: dry. The results are summarized in Table 2.

TABLE 2

| | Polymer Latex | | | | | | | |
|---|---|---|---|---|---|---|---|---|
| | PD1 | D1 | D2 | PD2 | D3 | D4 | CD1' [1] | CD2' [2] |
| tensile strength [psi] | 135 | 200 | – | 157 | 250 | – | 158 | 173 |
| elongation at break [%] | 397 | 143 | – | 288 | 31 | – | 465 | 371 |
| water absorption [%] | 11 | 5 | – | 9 | 4 | – | 14 | 13 |
| shower test [3] | – | + | + | – | – | + | + | + |
| storage stability [4] | + | + | + | + | + | + | – | – |
| degree of dryness | 1 | 2 | 3 | 0 | 2 | 3 | 3 | 3 |

[1] CD1' was prepared as described in Comparative Example 1 with the only exception that 1.35 g of Polyethyleneimine 1 were used.
[2] CD2' was prepared as described in Comparative Example 2 with the only exception that 2.03 g of Polyethyleneimine 1 were used.
[3] Rating – = coating washed off; Rating + = coating intact;
[4] Rating – = Dispersion forms visible coagulates and or shows strong increase in viscosity, Rating + = No significant increase in viscosity and no formation of coagulates.

As can be seen from Table 2, the polymer latexes D1 to D4 of the invention provide, on the one hand, significantly increased tensile strengths and, on the other hand, sharply reduced water absorptions. In addition, the inventive polymer latexes D1 to D4 give rise to improved resistances against rain immediately after coating (see shower test) and to faster drying of the films.

The invention claimed is:

1. An aqueous acrylic polymer latex having a dispersed polymer with a glass transition temperature $T_g$ of at most from −10° C., or, in case of a mixture of latexes or a multi-stage polymer latex, a weight average glass transition temperature $T_g$ of at most from −10° C., where the polymer of the acrylic polymer latex has a carbon polymer backbone formed by polymerized ethylenically unsaturated monomers M comprising acrylic monomers, and where the carbon polymer backbone bears functional groups of the formula (I) attached to carbon atoms of the polymer backbone

*—C(=O)—O-[A-NH]$_n$H  (I)

where the asterisk * indicates the atom attached to a carbon atom of the polymer backbone, n is an integer, the number average of n in all functional groups of the formula (I) being >1 and A is selected from the group consisting of 1,2-ethandiyl or 1,2-propandiyl, where the functional groups of the formula (I) contribute to the total weight of the polymer in the acrylic polymer latex by 0.1 to 10% by weight and where the polymer optionally may bear carboxyl groups, provided that the molar amount of carboxyl groups is in the range from $10^{-3}$ to 0.5 mol/kg and does not exceed the molar amount of functional groups of the formula (I);

and where the glass transition temperature $T_g$ is determined by differential scanning calorimetry using a heating rate of 20 K/min and applying midpoint measurement in accordance with ISO 11357-2:2013-05.

2. The aqueous acrylic polymer latex of claim 1, where n is an integer in the range of 1 to 10 and the number average of n in all functional groups of the formula (I) is 1.1 to 5.

3. The aqueous acrylic polymer latex of claim 1, where A is 1,2-ethandiyl.

4. The aqueous acrylic polymer latex of claim 1, wherein the polymer in the latex additionally contains functional groups, selected from keto groups and aldehyde groups.

5. The aqueous acrylic polymer latex, which is obtained by reacting a carboxylated acrylic polymer latex having a glass transition temperature $T_g$ of at most from −10° C., or, in case of a multi-stage polymer latex a weight average glass transition temperature $T_g$ of at most from −10° C., with at least one aziridine compound selected from aziridine, 2-methylaziridine and mixtures of aziridine and 2-methylaziridine, where the polymer of the carboxylated acrylic polymer latex is formed by polymerized ethylenically unsaturated monomers M, which comprise acrylic monomers, from 0.1 to 10% by weight, based on the total weight of the monomers M, of at least one ethylenically unsaturated monomer having 1 or 2 carboxyl groups, where the amount of the aziridine compound is used in a molar ratio of aziridine compound to carboxyl groups present in the carboxylated latex of at least 1:1, where the glass transition temperature $T_g$ is determined by differential scanning calorimetry using a heating rate of 20 K/min and applying midpoint measurement in accordance with ISO 11357-2:2013-05.

6. The aqueous acrylic polymer latex of claim 5, where the aziridine compound is used in an amount of 1 to 5 mol per 1 mol of carboxyl groups in the carboxylated latex.

7. The aqueous acrylic polymer latex of claim 1, where the ethylenically unsaturated monomers M forming the polymer backbone comprise from 80 to 99.9% by weight, based on the total weight of the monomers M, of at least one non-ionic monomer M1a, which is selected from $C_1$-$C_{20}$-alkyl esters of acrylic acid, or a mixture of at least one non-ionic monomer M1a, with at least one further non-ionic monomer M1b, which is selected from $C_1$-$C_{20}$-alkylesters of methacrylic acid, and mono vinyl aromatic hydrocarbon monomers and mixtures thereof;

from 0.1 to 10% by weight, based on the total weight of the monomers M, of at least one monoethylenically unsaturated monomer M2, which is selected from monoethylenically unsaturated monocarboxylic acids having 3 to 6 carbon atoms and monoethylenically unsaturated dicarboxylic acids having 4 to 6 carbon atoms, and optionally 0 to 10% by weight, based on the total weight of the monomers M of one or more non-ionic monomers M3, which are different from monomers M1.

8. The aqueous acrylic polymer latex of claim 1, which contains less than 0.1% by weight, based on the total weight of the polymer latex, of volatile base.

9. The aqueous acrylic polymer latex of claim 1, which has a pH in the range from 8 to 11.

10. A method for preparing an aqueous acrylic polymer latex as claimed in claim 1, which comprises reacting a carboxylated acrylic polymer latex having a glass transition temperature $T_g$ of at most from −10° C., or, in case of a multi-stage acrylic polymer latex a weight average glass transition temperature $T_g$ of at most from −10° C., with at least one aziridine compound selected from aziridine, 2-methylaziridine and mixtures of aziridine and 2-methylaziridine, where the polymer of the carboxylated acrylic polymer latex is formed by polymerized ethylenically unsaturated monomers M, which comprise acrylic monomers and from 0.1 to 10% by weight, based on the total weight of the monomers M, of at least one ethylenically unsaturated monomer having 1 or 2 carboxyl groups, and where the amount of the aziridine compound is used in a molar ratio of aziridine compound to carboxyl groups present in the carboxylated latex of at least 1:1, where the glass transition temperature $T_g$ is determined by differential scanning calorimetry using a heating rate of 20 K/min and applying midpoint measurement in accordance with ISO 11357-2:2013-05.

11. An aqueous coating composition for providing flexible roofing, comprising the acrylic polymer latex as claimed in claim 1 and at least one inorganic particulate material selected from inorganic pigments, inorganic fillers and mixtures thereof.

12. The coating composition of claim 11, containing at least one inorganic filler selected from natural calcium carbonates, synthetic calcium carbonates, calcium silicates and alkalimetal silicates.

13. The coating composition of claim 11, additionally containing at least one inorganic white pigment.

14. The coating composition of claim 11 having a pigment volume concentration pvc in the range from 15 to 50%.

15. A method for providing a flexible roofing, which comprises applying an aqueous coating composition as claimed in claim 11 to a flat roof having an inclination of not more than 15°.

* * * * *